(12) United States Patent
Lei et al.

(10) Patent No.: US 11,871,431 B2
(45) Date of Patent: *Jan. 9, 2024

(54) PHYSICAL RESOURCE AND TRANSMISSION PARAMETER CONFIGURATION WITHOUT A RADIO RESOURCE CONTROL CONNECTION

(71) Applicant: QUALCOMM Incorporated, San Diego, CA (US)

(72) Inventors: Jing Lei, San Diego, CA (US); Linhai He, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/949,950

(22) Filed: Sep. 21, 2022

(65) Prior Publication Data

US 2023/0015013 A1 Jan. 19, 2023

Related U.S. Application Data

(63) Continuation of application No. 17/039,982, filed on Sep. 30, 2020, now Pat. No. 11,483,855.
(Continued)

(51) Int. Cl.
*H04W 72/23* (2023.01)
*H04W 72/1273* (2023.01)
(Continued)

(52) U.S. Cl.
CPC .......... *H04W 72/23* (2023.01); *H04L 1/0061* (2013.01); *H04L 5/0051* (2013.01); *H04L 5/10* (2013.01);
(Continued)

(58) Field of Classification Search
CPC ....... H04L 1/0061; H04L 5/0051; H04L 5/10; H04L 5/0044; H04L 5/008; H04L 5/0094;
(Continued)

(56) References Cited

U.S. PATENT DOCUMENTS

2018/0287750 A1* 10/2018 Abdoli .................. H04W 72/23
2018/0288746 A1 10/2018 Zhang et al.
(Continued)

FOREIGN PATENT DOCUMENTS

CN 109428698 A 3/2019
WO WO2018231621 A1 12/2018

OTHER PUBLICATIONS

Asustek: "Discussion on PUR Resource Configuration in Respect to Radio Condition", 3GPP TSG-RAN WG2 Meeting #106, 3GPP Draft, R2-1906550, Discussion on PUR Resource Configuration in Respect to Radio Condition, 3rd Generation Partnership Project (3GPP), Mobile Competence Centre, 650, Route Des Lucioles, F-06921, Sophia-Antipolis Cedex, France, vol. RAN WG2, No. Reno, USA, May 13, 2019-May 17, 2019, May 13, 2019 (May 13, 2019), 3 pages, XP051730011, Section 2, the whole document.
(Continued)

*Primary Examiner* — Rownak Islam
(74) *Attorney, Agent, or Firm* — Holland & Hart LLP

(57) ABSTRACT

Methods, systems, and devices for wireless communication are described. Generally, the described techniques provide for efficiently signaling configurations of physical resources and transmission parameters to a user equipment (UE) for small data transmissions (for example, data transmissions in an inactive or idle state). A base station may broadcast or multicast downlink control information (DCI) in one or more control channels that schedules data transmissions in a set of data channels. The base station may then multicast one or more configurations in each of the data channels, and a
(Continued)

UE may decode one of the data channels to determine a configuration for a small data transmission. Because the configurations may be transmitted in the data channels in addition to system information or paging information, a base station may have access to sufficient resources to provide suitable configurations to a UE for communications in an inactive or idle state.

30 Claims, 17 Drawing Sheets

Related U.S. Application Data

(60) Provisional application No. 62/909,477, filed on Oct. 2, 2019.

(51) Int. Cl.
  *H04L 1/00* (2006.01)
  *H04W 76/11* (2018.01)
  *H04L 5/10* (2006.01)
  *H04L 5/00* (2006.01)
  *H04W 72/50* (2023.01)

(52) U.S. Cl.
  CPC ..... *H04W 72/1273* (2013.01); *H04W 72/535* (2023.01); *H04W 76/11* (2018.02)

(58) Field of Classification Search
  CPC ............. H04W 72/23; H04W 72/1273; H04W 72/535; H04W 76/11; H04W 72/1268
  USPC ........................................................ 370/329
  See application file for complete search history.

(56) References Cited

U.S. PATENT DOCUMENTS

| | | | |
|---|---|---|---|
| 2020/0351955 A1* | 11/2020 | Jeon | H04W 80/02 |
| 2021/0045181 A1 | 2/2021 | Li et al. | |
| 2021/0105808 A1 | 4/2021 | Lei et al. | |
| 2021/0218495 A1 | 7/2021 | Bi et al. | |
| 2021/0298108 A1 | 9/2021 | Wu et al. | |
| 2022/0217718 A1* | 7/2022 | Hu | H04W 72/0446 |

OTHER PUBLICATIONS

Intel Corporation: "UL Transmission in Preconfigured Resources for eMTC", 3GPP TSG RAN WG1 Meeting #97, 3GPP Draft; R1-1908614 PUR EMTC, 3rd Generation Partnership Project (3GPP), Mobile Competence Centre; 650, Route Des Lucioles; F-06921 Sophia-Antipolis Cedex; France vol. RAN WG1, No. Prague, CZ; Aug. 26, 2019-Aug. 30, 2019, Aug. 17, 2019 (Aug. 17, 2019), pp. 1-5, XP051765222, Retrieved from the Internet: URL: http://www.3gpp.org/ftp/tsg_ran/WG1_RL1/TSGR1_98/Docs/R1-1908614.zip [retrieved on Aug. 17, 2019] Section 4; p. 3.
International Preliminary Report on Patentability—PCT/US2020/053839 The International Bureau of WIPO—Geneva, Switzerland, dated Apr. 14, 2022.
International Search Report and Written Opinion—PCT/US2020/053839—ISA/EPO—dated Dec. 23, 2020.

* cited by examiner

PHYSICAL RESOURCE AND TRANSMISSION PARAMETER CONFIGURATION WITHOUT A RADIO RESOURCE CONTROL CONNECTION

CROSS REFERENCE

The present Application for Patent is a Continuation of U.S. patent application Ser. No. 17/039,982 by LEI et al., entitled "PHYSICAL RESOURCE AND TRANSMISSION PARAMETER CONFIGURATION WITHOUT A RADIO RESOURCE CONTROL CONNECTION" filed Sep. 30, 2020, which claims the benefit of U.S. Provisional Patent Application No. 62/909,477 by LEI et al., entitled "PHYSICAL RESOURCE AND TRANSMISSION PARAMETER CONFIGURATION WITHOUT A RADIO RESOURCE CONTROL CONNECTION," filed Oct. 2, 2019, assigned to the assignee hereof, and expressly incorporated by reference herein.

DESCRIPTION OF THE RELATED TECHNOLOGY

The following relates generally to wireless communications and more specifically to physical resource and transmission parameter configuration without a radio resource control (RRC) connection.

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a user equipment (UE) may be capable of transitioning to different states depending on the level of activity at the UE. For instance, the UE may support a connected state in which the UE may be actively communicating with a base station, an inactive state in which the UE may achieve some power savings while being able to quickly transition back to a connected state (for example, when appropriate), and an idle state in which the UE may achieve power savings. In some cases, it may be appropriate for a UE in an inactive or idle state to transmit or receive small amounts of data without transitioning to the connected state (for example, because transitioning to the connected state may result in significant overhead). Techniques for supporting communications in an inactive or idle state may be deficient.

SUMMARY

The described techniques relate to improved methods, systems, devices, and apparatuses that support physical resource and transmission parameter configuration for grant-free uplink transmissions without a radio resource control (RRC) connection. Generally, the described techniques provide for efficiently signaling physical resource and transmission parameter configurations to a user equipment (UE) for the UE to use to receive downlink data or transmit uplink data while in an inactive or idle state (for example, without transitioning to a connected state). A base station may broadcast or multicast downlink control information (DCI) in one or more control channels that schedules data transmissions in a set of data channels. The base station may then transmit one or more resource configurations in each of the data channels, and a UE may decode one of the downlink data channels to determine a physical resource and transmission parameter configuration for receiving downlink data or transmitting uplink preambles, uplink control information, or uplink data to a base station. Because the physical resource and transmission parameter configurations may be multicast in the downlink data channels and these downlink data channels can be multiplexed on the same time or frequency resources, a base station may have access to sufficient resources to provide suitable uplink physical resource and transmission parameter configurations to a UE for grant-free communications in a non-connected RRC state, such as an RRC inactive or RRC idle state. These uplink configurations for a non-connected UE can also be used by a UE in an RRC connected state as a default or fallback configuration.

One innovative aspect of the subject matter described in this disclosure can be implemented in a method for wireless communication at a UE operating in a non-connected state. The method may include receiving, in the non-connected state, group common downlink control information in one or more group common downlink control channels including a first group common downlink control channel, the one or more group common downlink control channels scheduling a set of downlink data channels, each downlink data channel indicating at least a respective configuration of physical resources and transmission parameters usable for grant-free uplink transmission, determining, in the non-connected state, scheduling information and a group radio network temporary identifier for a first downlink data channel of the set of downlink data channels based on the group common downlink control information received in the first group common downlink control channel, receiving, in the non-connected state in the first downlink data channel according to the identified scheduling information and the group radio network temporary identifier, a first configuration of physical resources and transmission parameters to be used for a grant-free uplink transmission of one or more of a preamble, control information, or data, and transmitting, in the non-connected state, the grant-free uplink transmission to the base station based on the first configuration of physical resources and transmission parameters.

An apparatus for wireless communication at a UE operating in a non-connected state is described. The apparatus may include a processor, memory coupled with the processor, and instructions stored in the memory. The instructions may be executable by the processor to cause the apparatus to receive, in the non-connected state, group common downlink control information in one or more group common downlink control channels including a first group common downlink control channel, the one or more group common downlink control channels scheduling a set of downlink data channels, each downlink data channel indicating at least a respective configuration of physical resources and transmission parameters usable for grant-free uplink transmission, determine, in the non-connected state, scheduling information and a group radio network temporary identifier for a first downlink data channel of the set of downlink data channels based on the group common downlink control information received in the first group common downlink control channel, receive, in the non-connected state in the first downlink data channel according to the identified scheduling information and the group radio network temporary identifier, a first configuration of physical resources and transmission parameters to be used for a grant-free uplink transmission of one or more of a preamble, control information, or data, and transmit, in the non-connected state, the grant-free uplink transmission to the base station based on the first configuration of physical resources and transmission parameters.

Another apparatus for wireless communication at a UE operating in a non-connected state is described. The apparatus may include means for receiving, in the non-connected state, group common downlink control information in one or more group common downlink control channels including a first group common downlink control channel, the one or more group common downlink control channels scheduling a set of downlink data channels, each downlink data channel indicating at least a respective configuration of physical resources and transmission parameters usable for grant-free uplink transmission, determining, in the non-connected state, scheduling information and a group radio network temporary identifier for a first downlink data channel of the set of downlink data channels based on the group common downlink control information received in the first group common downlink control channel, receiving, in the non-connected state in the first downlink data channel according to the identified scheduling information and the group radio network temporary identifier, a first configuration of physical resources and transmission parameters to be used for a grant-free uplink transmission of one or more of a preamble, control information, or data, and transmitting, in the non-connected state, the grant-free uplink transmission to the base station based on the first configuration of physical resources and transmission parameters.

A non-transitory computer-readable medium storing code for wireless communication at a UE operating in a non-connected state is described. The code may include instructions executable by a processor to receive, in the non-connected state, group common downlink control information in one or more group common downlink control channels including a first group common downlink control channel, the one or more group common downlink control channels scheduling a set of downlink data channels, each downlink data channel indicating at least a respective configuration of physical resources and transmission parameters usable for grant-free uplink transmission, determine, in the non-connected state, scheduling information and a group radio network temporary identifier for a first downlink data channel of the set of downlink data channels based on the group common downlink control information received in the first group common downlink control channel, receive, in the non-connected state in the first downlink data channel according to the identified scheduling information and the group radio network temporary identifier, a first configuration of physical resources and transmission parameters to be used for a grant-free uplink transmission of one or more of a preamble, control information, or data, and transmit, in the non-connected state, the grant-free uplink transmission to the base station based on the first configuration of physical resources and transmission parameters.

Some examples of the method, apparatuses, and non-transitory computer-readable medium described herein may further include operations, features, means, or instructions for determining one or more selection criteria associated with the respective configurations of physical resources and transmission parameters indicated by the set of downlink data channels, and selecting the first data channel that includes the first configuration of physical resources and transmission parameters based on the identified one or more selection criteria. Some examples of the method, apparatuses, and non-transitory computer-readable medium described herein may further include operations, features, means, or instructions for receiving an indication of the one or more selection criteria in the group common downlink control information or in an information block different than the group common downlink control information.

In some examples of the method, apparatuses, and non-transitory computer-readable medium described herein, the one or more selection criteria include one or more of a reference signal power threshold, a reference signal strength threshold, a reference signal quality threshold, a cell-specific parameter associated with the base station, a buffer status, a power head room, or a quality of service class. In some examples of the method, apparatuses, and non-transitory computer-readable medium described herein, each downlink data channel of the set of downlink data channels may be scrambled using a respective group radio network temporary identifier of a set of group radio network temporary identifiers, and in which the set of group radio network temporary identifiers may be received in the group common downlink control information or in an information block different than the group common downlink control information.

Some examples of the method, apparatuses, and non-transitory computer-readable medium described herein may further include operations, features, means, or instructions for receiving, in the group common downlink control information, an indication of a number of the set of downlink data channels scheduled by the group common downlink control information. Some examples of the method, apparatuses, and non-transitory computer-readable medium described herein may further include operations, features, means, or instructions for receiving a master information block or a system information block including an indication of a number of the one or more group common downlink control channels including the group common downlink control information.

In some examples of the method, apparatuses, and non-transitory computer-readable medium described herein, a number of the set of downlink data channels scheduled by the group common downlink control information may be implicitly indicated by one or more of a control channel element resource mapping, a demodulation reference signal mapping, or a cyclic redundancy check masking. In some examples of the method, apparatuses, and non-transitory computer-readable medium described herein, the group common downlink control information may include a first downlink control information subfield that includes at least the scheduling information and the group radio network temporary identifier for the first downlink data channel, and a second downlink control information subfield that includes at least scheduling information and a group radio network temporary identifier for a second downlink data channel of the set of downlink data channels.

In some examples of the method, apparatuses, and non-transitory computer-readable medium described herein, the first downlink control information subfield and the second downlink control information subfield of the group common downlink control information may be mapped to a first group common downlink control channel and a second group common downlink control channel, respectively, which may be multicast in a common search space configured in an initial downlink bandwidth part. In some examples of the method, apparatuses, and non-transitory computer-readable medium described herein, the first downlink control information subfield and the second downlink control information subfield of the group common downlink control information may be aggregated and mapped to a same group common downlink control channel, which may be multicast in a common search space configured in an initial downlink bandwidth part.

In some examples of the method, apparatuses, and non-transitory computer-readable medium described herein, receiving the group common downlink control information may include operations, features, means, or instructions for receiving the first downlink control information subfield of the group common downlink control information and extracting the scheduling information and the first group radio network temporary identifier used to scramble the first downlink data channel, and receiving the second downlink control information subfield of the group common downlink control information and extracting the scheduling information and the group radio network temporary identifier for the second downlink data channel used to scramble the second downlink data channel.

In some examples of the method, apparatuses, and non-transitory computer-readable medium described herein, the set of downlink data channels may be multiplexed based on a multiplexing scheme comprising one or more of code division multiplexing, frequency division multiplexing, space division multiplexing, or time division multiplexing, and scheduling information of the group common downlink control information indicates the multiplexing scheme. In some examples of the method, apparatuses, and non-transitory computer-readable medium described herein, the non-connected state includes one or more of an RRC idle state or an RRC inactive state.

In some examples of the method, apparatuses, and non-transitory computer-readable medium described herein, two configurations of physical resources and transmission parameters may be associated with one or more of different transport block sizes, different demodulation reference signal resource configurations, different time and frequency resource allocations, different modulation and coding schemes, different frequency hopping schemes, different slot aggregation schemes, different repetition schemes, different waveforms, different hybrid automatic repeat request parameters, different power control parameters, different sharing patterns of preamble occasions and sequences between two-step and four-step random access procedures, different patterns and periodicities for an association of synchronization signal blocks (SSB) with preamble occasions and sequences, different length of random access response windows, different control resource sets or search spaces for random access response messages, or different bandwidth part configurations.

In some examples of the method, apparatuses, and non-transitory computer-readable medium described herein, the first configuration includes one or more a semi-persistent configuration, a default configuration, or a fallback configuration, usable by UEs in non-connected state and connected state.

Another innovative aspect of the subject matter described in this disclosure can be implemented in a method for wireless communication at a base station. The method may include determining a set of configurations of physical resources and transmission parameters usable by a set of UEs, while operating in a non-connected state, for grant-free uplink transmission to the base station, transmitting, in one or more group common downlink control channels, group common downlink control information including at least scheduling information and a group radio network temporary identifier for each of a set of downlink data channels, scrambling each of the set of downlink data channels with a respective group radio network temporary identifier, multicasting, in each downlink data channel of the set of downlink data channels, a configuration of physical resources and transmission parameters of the set of configurations for a subset of the set of UEs according to the scheduling information transmitted in the one or more group common downlink control channels, and multiplexing each downlink data channel with other downlink data channels of the set of downlink data channels scheduled by the one or more group common downlink control channels, based on a multiplexing scheme comprising one or more of code division multiplexing, frequency division multiplexing, space division multiplexing, or time division multiplexing, in which scheduling information for the set of downlink data channels indicates the multiplexing scheme.

An apparatus for wireless communication at a base station is described. The apparatus may include a processor, memory coupled with the processor, and instructions stored in the memory. The instructions may be executable by the processor to cause the apparatus to determine a set of configurations of physical resources and transmission parameters usable by a plurality of UEs, while operating in a non-connected state, for grant-free uplink transmission to the base station, transmit, in one or more group common downlink control channels, group common downlink control information including at least scheduling information and a group radio network temporary identifier for each of a set of downlink data channels, scramble each of the set of downlink data channels with a respective group radio network temporary identifier, multicast, in each downlink data channel of the set of downlink data channels, a configuration of physical resources and transmission parameters of the set of configurations for a subset of the set of UEs according to the scheduling information transmitted in the one or more group common downlink control channels, and multiplex each downlink data channel with other downlink data channels of the set of downlink data channels scheduled by the one or more group common downlink control channels, based on a multiplexing scheme comprising one or more of code division multiplexing, frequency division multiplexing, space division multiplexing, or time division multiplexing, in which scheduling information for the set of downlink data channels indicates the multiplexing scheme.

Another apparatus for wireless communication at a base station is described. The apparatus may include means for determining a set of configurations of physical resources and transmission parameters usable by a set of UEs, while operating in a non-connected state, for grant-free uplink transmission to the base station, transmitting, in one or more group common downlink control channels, group common downlink control information including at least scheduling information and a group radio network temporary identifier for each of a plurality of downlink data channels, scrambling each of the set of downlink data channels with a respective group radio network temporary identifier, multicasting, in each downlink data channel of the set of downlink data channels, a configuration of physical resources and transmission parameters of the set of configurations for a subset of the set of UEs according to the scheduling information transmitted in the one or more group common downlink control channels, and multiplexing each downlink data channel with other downlink data channels of the set of downlink data channels scheduled by the one or more group common downlink control channels, based on a multiplexing scheme comprising one or more of code division multiplexing, frequency division multiplexing, space division multiplexing, or time division multiplexing, in which scheduling information for the set of downlink data channels indicates the multiplexing scheme.

A non-transitory computer-readable medium storing code for wireless communication at a base station is described. The code may include instructions executable by a processor to determine a set of configurations of physical resources and transmission parameters usable by a set of UEs to use, in a non-connected state, for grant-free uplink transmission to the base station, transmit, in one or more group common downlink control channels, group common downlink control information including at least scheduling information and a group radio network temporary identifier for each of a set of downlink data channels, scramble each of the set of downlink data channels with a respective group radio network temporary identifier, multicast, in each downlink data channel of the set of downlink data channels, a configuration of physical resources and transmission parameters of the set of configurations for a subset of the set of UEs according to the scheduling information transmitted in the one or more group common downlink control channels, and multiplex each downlink data channel with other downlink data channels of the set of downlink data channels scheduled by the one or more group common downlink control channels, based on a multiplexing scheme comprising one or more of code division multiplexing, frequency division multiplexing, space division multiplexing, or time division multiplexing, in which scheduling information for the set of downlink data channels indicates the multiplexing scheme.

Some examples of the method, apparatuses, and non-transitory computer-readable medium described herein may further include operations, features, means, or instructions for transmitting one or more selection criteria associated with the set of configurations, the one or more selection criteria being for the set of UEs to use to select from the set of configurations. In some examples of the method, apparatuses, and non-transitory computer-readable medium described herein, the one or more selection criteria or the set of group radio network temporary identifiers used to scramble the set of downlink data channels may be transmitted together with the group common downlink control information. In some examples of the method, apparatuses, and non-transitory computer-readable medium described herein, the one or more selection criteria may be transmitted in an information block separately from the group common downlink control information.

In some examples of the method, apparatuses, and non-transitory computer-readable medium described herein, the one or more selection criteria include one or more of a reference signal power threshold, or a reference signal strength threshold, or a reference signal quality threshold, or a cell-specific parameter associated with the base station, or a buffer status, or a power head room, or a quality of service class. In some examples of the method, apparatuses, and non-transitory computer-readable medium described herein, transmitting the one or more selection criteria may include operations, features, means, or instructions for broadcasting the one or more selection criteria for the set of UEs in non-connected state and connected state. Some examples of the method, apparatuses, and non-transitory computer-readable medium described herein may further include operations, features, means, or instructions for transmitting, in the group common downlink control information, an indication of a number of the set of downlink data channels scheduled by the group common downlink control information.

In some examples of the method, apparatuses, and non-transitory computer-readable medium described herein, transmitting the indication of the number of the set of downlink data channels may include operations, features, means, or instructions for transmitting a master information block or a system information block including the indication of the number of the set of downlink data channels. In some examples of the method, apparatuses, and non-transitory computer-readable medium described herein, a number of the set of downlink data channels scheduled by the group common downlink control information may be indicated implicitly by one or more of a control channel element resource mapping, or a demodulation reference signal mapping, or a cyclic redundancy check masking.

In some examples of the method, apparatuses, and non-transitory computer-readable medium described herein, transmitting the group common downlink control information may include operations, features, means, or instructions for broadcasting the group common downlink control information for the set of UEs in non-connected state and connected state. In some examples of the method, apparatuses, and non-transitory computer-readable medium described herein, the group common downlink control information may include a first downlink control information subfield that includes at least scheduling information and a group radio network temporary identifier for a first downlink data channel, and a second downlink control information subfield that includes at least scheduling information and a group radio network temporary identifier for a second downlink data channel of the set of downlink data channels.

In some examples of the method, apparatuses, and non-transitory computer-readable medium described herein, transmitting the group common downlink control information may include operations, features, means, or instructions for multicasting the group common downlink control information to the set of UEs in non-connected state and connected state. In some examples of the method, apparatuses, and non-transitory computer-readable medium described herein, multicasting the group common downlink control information may include operations, features, means, or instructions for transmitting a first group common downlink control channel for a first group of UEs of the set of UEs, the first group common downlink control channel including scheduling information and a group radio network temporary identifier for a first downlink data channel of the set of downlink data channels, and transmitting a second group common downlink control channel for a second group of UEs of the set of UEs the second group common downlink control channel including scheduling information and a group radio network temporary identifier for a second downlink data channel of the set of downlink data channels.

In some examples of the method, apparatuses, and non-transitory computer-readable medium described herein, the set of downlink data channels may be multiplexed based on a multiplexing scheme comprising one or more of code division multiplexing, frequency division multiplexing, space division multiplexing, or time division multiplexing. In some examples of the method, apparatuses, and non-transitory computer-readable medium described herein, the non-connected state includes one or more of an RRC idle state or an RRC inactive state.

In some examples of the method, apparatuses, and non-transitory computer-readable medium described herein, two configurations of the set of resource configurations may be associated with one or more of different transport block sizes, or different demodulation reference signal resource configurations, or different time and frequency resource allocations, or different modulation and coding schemes, different frequency hopping schemes, different slot aggregation schemes, different repetition schemes, different waveforms, different hybrid automatic repeat request parameters, different power control parameters, different sharing patterns of preamble occasions and sequences between two-step and four-step random access procedures, different patterns and periodicities for the association of synchronization signal blocks (SSB) with preamble occasions and sequences, different length of random access response windows, different control resource sets or search spaces for random access response messages, or different bandwidth part configurations.

Some examples of the method, apparatuses, and non-transitory computer-readable medium described herein may further include operations, features, means, or instructions for determining a configuration of physical resources and transmission parameters of the set of configurations to be selected by a UE of the set of UEs for communicating with the base station in the non-connected state, indicating the identified configuration in a downlink data channel of the set of downlink data channels multicast to a set of UEs, and receiving an uplink transmission from the UE according to the identified configuration.

DETAILED DESCRIPTION

Figure 1:
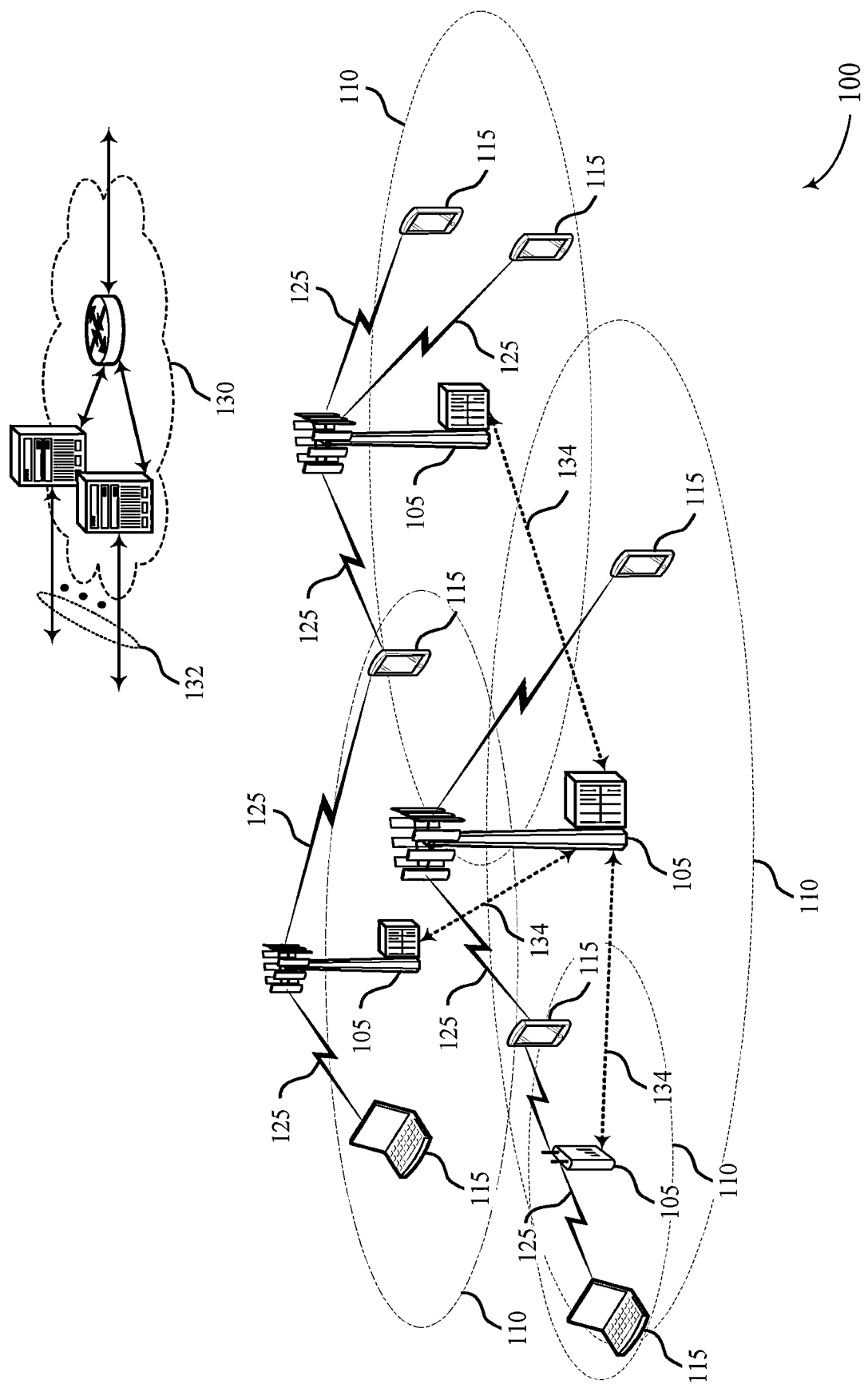
FIGS. 1 and 2 illustrate examples of wireless communications systems that support physical resource and transmission parameter configuration without a radio resource control (RRC) connection in accordance with aspects of the present disclosure.

In some wireless communications systems, a user equipment (UE) may be capable of transmitting or receiving small amounts of data in a non-connected state (for example, an inactive or idle state) without transitioning to a connected state (for example, because transitioning to the connected state may result in significant overhead and may not be inappropriate for small data transmissions). In such systems, the UE may receive a downlink or uplink resource configuration for a small data transmission in paging information or system information from a base station. In some cases, however, the payload size of paging information and system information may be limited (for example, by the link budget of a cell edge UE). Thus, paging information or system information may not be suitable for signaling a downlink or uplink resource configuration for a small data transmission (for example, especially because it may be appropriate to support flexible configurations for small data transmissions depending on traffic patterns, cell sizes, system loading, among other examples).

Various aspects generally relate to wireless communications, and more specifically, to techniques for signaling physical resources and transmission parameter configurations to a UE for the UE to use to receive downlink data or transmit uplink data while in an inactive or idle state (for example, without transitioning to a connected state). For example, a base station may broadcast or multicast downlink control information (DCI) in one or more control channels that schedules data transmissions in a set of data channels. The base station may transmit one or more resource configurations in each of the data channels, and a UE may decode one of the data channels to determine a physical resource and transmission parameter configuration for receiving downlink data from a base station or transmitting uplink data to a base station if in a non-connected state. These uplink configurations for a non-connected UE can also be used by a UE in a connected state as a default or fallback configuration.

Particular aspects of the subject matter described in this disclosure may be implemented to realize one or more potential advantages. For example, using these techniques may allow a wireless communications system to efficiently signal physical resource and transmission parameter configurations to a UE. Specifically, because a base station may transmit the physical resource and transmission parameter configurations in data channels rather than in system information or paging information, and because data channels may be multiplexed on same time or frequency resources, the base station may have access to sufficient resources to provide suitable configurations to a UE for communications in an inactive or idle state. Accordingly, the base station may be capable of indicating a wide range of configurations to a UE for communications in a non-connected state. Additionally or alternatively, the base station may signal criteria for a UE to use to select a physical resource and transmission parameter configuration to facilitate UE-specific selections of configurations without a dedicated grant. As a result, system throughput and resource utilization efficiency may be enhanced with limited signaling overhead for base stations and low decoding complexity for UEs. In some implementations, operations performed by the described communication devices may also support improvements to power consumption, reliability for uplink communications, spectral efficiency, higher data rates and, in some examples, low latency for uplink communications, among other benefits.

Aspects of the disclosure introduced above are described below in the context of a wireless communications system. Examples of processes and signaling exchanges that support resource configuration without an RRC connection are then described. Aspects of the disclosure are further illustrated by and described with reference to apparatus diagrams, system diagrams, and flowcharts that relate to resource configuration without an RRC connection.

FIG. 1 illustrates an example of a wireless communications system 100 that supports resource configuration without an RRC connection in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, among other examples.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (for example, in a physical uplink control channel (PUCCH) or a physical uplink shared channel (PUSCH)), or downlink transmissions from a base station 105 to a UE 115 (for example, in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (for example, a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)) and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, in which the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or other examples, which may be implemented in various articles such as appliances, vehicles, meters, or other examples.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode if not engaging in active communications, or operating over a limited bandwidth (for example, according to narrowband communications). In some cases, UEs 115 may be designed to support critical functions (for example, mission critical functions), and a wireless communications system 100 may be configured to provide ultra-reliable communications for these functions.

In some cases, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), in which the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams. Different spatial layers may be associated with different antenna ports used for channel measurement and reporting. MIMO techniques include single-user MIMO (SU-MIMO) in which multiple spatial layers are transmitted to the same receiving device, and multiple-user MIMO (MU-MIMO) in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In some examples, a base station 105 may use multiple antennas or antenna arrays to conduct beamforming operations for directional communications with a UE 115. For instance, some signals (for example synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to determine (for example, by the base station 105 or a receiving device, such as a UE 115) a beam direction for subsequent transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for determining a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, if receiving a data signal). The single receive beam may be aligned in a beam direction determined based at least in part on listening according to different receive beam directions (for example, a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some cases, a wireless device may support same-slot HARQ feedback, in which the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), in which the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In wireless communications system 100, a UE 115 may be capable of transitioning to different states depending on the level of activity at the UE 115. For instance, the UE 115 may support an RRC connected state in which the UE 115 may be actively communicating with a base station 105, an RRC inactive state in which the UE 115 may achieve some power savings while being able to quickly transition back to an RRC connected state (for example, because the UE 115 may store previous configurations before transitioning to the inactive state), and an RRC idle state in which the UE 115 may achieve power savings. A non-connected state may be either of an RRC idle state or an RRC inactive state. In aspects described herein, inactive or idle UEs 115 may also support small data transmissions without transitioning to a connected state (for example, because transitioning to the connected state may result in significant overhead and may not be appropriate for small data transmissions). For example, small quantities of data for mobile terminated (MT) or mobile originated (MO) traffic may be transmitted directly to or from RRC idle or RRC inactive UEs 115 without moving to an RRC connected state.

If a UE 115 determines to transmit or receive data in an inactive or idle state, the UE 115 may perform a two or four step random access procedure before transmitting or receiving the data, or, in other aspects, the UE 115 may transmit or receive the data on pre-allocated resources without receiving a grant (for example, a grant-free data transmission with no preamble transmission). Further, the UE 115 may receive a downlink or uplink resource configuration for transmitting or receiving the data in the inactive or idle state in paging information or system information from a base station 105. In some cases, for small data transmissions in an inactive or idle state (for example, without an RRC connection), flexible resource configurations or different types of resource configurations may be desirable. For instance, depending on the traffic pattern and use cases, the packet sizes for small MT or MO data may have a large range (for example, a few bytes to hundreds or thousands of bytes), and it may be appropriate for a UE 115 to determine different resource configurations for different packet sizes. Additionally or alternatively, depending on the cell size and system loading, it may be appropriate for a UE 115 to determine flexible configurations for modulation and coding schemes (MCSs), waveform and time/frequency resource allocations, among other examples, to enhance the throughput and resource utilization efficiency.

In some cases, however, the payload size of paging information or system information may be limited (for example, by the link budget of a cell edge UE 115). Thus, paging information or system information may not be suitable for signaling a downlink or uplink resource configuration for a small data transmission such as a data transmission in an inactive or idle state (for example, especially because it may be appropriate to support flexible configurations or different types of configurations for these data transmissions). A wireless communications system 100 may support efficient techniques for signaling resource configurations to a UE 115 for small data transmissions (for example, data transmissions in an inactive or idle state). In particular, a wireless communications system 100 may support signaling enhancement to support the multicasting of downlink and uplink resource configurations for UEs 115 without RRC connections. Additionally or alternatively, a base station 105 may signal the criteria for a UE 115 to use to select a resource configuration (for example, for resource selection) to facilitate UE-specific selections of suitable resource configurations without a dedicated grant. Using these techniques, system throughput and resource utilization efficiency may be enhanced with limited signaling overhead for base stations 105 and low decoding complexity for UEs 115.

Figure 2:
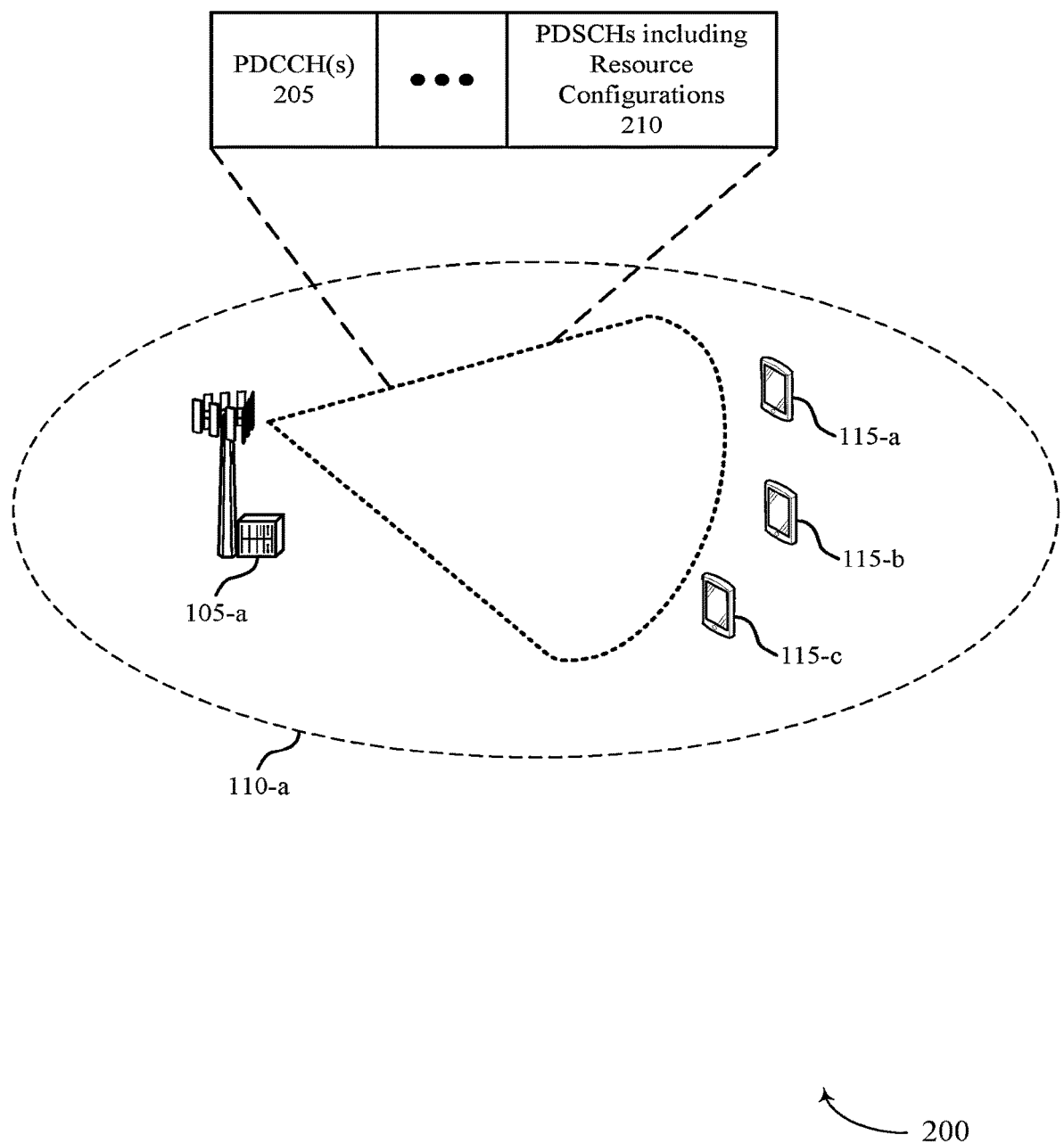

FIG. 2 illustrates an example of a wireless communications system 200 that supports physical resource and transmission parameter configuration without an RRC connection in accordance with aspects of the present disclosure. The wireless communications system 200 may include a base station 105-a, which may be an example of a base station 105 described with reference to FIG. 1. The wireless communications system 200 may also include UE 115-a, UE 115-b, and UE 115-c which may be examples of a UE 115 described with reference to FIG. 1. The wireless communications system 200 may implement aspects of a wireless communications system 100 as described with reference to FIG. 1. For example, the wireless communications system 200 may support efficient techniques for signaling resource configurations to a UE 115 for small data transmissions (for example, data transmissions to or from the UE 115 in an inactive or idle state).

In some examples, the base station 105-a (for example, the network) may determine K (K>1) distinctive types of downlink or uplink resource configurations for UEs 115 without RRC connections to use for communications in an inactive or idle state (for example, used simultaneously by K groups of UEs 115). As an example, K may be equal to four and may correspond to four different transport block sizes (TBSs) for small MO data transmissions from a UE 115 in an RRC inactive or RRC idle state (for example, TBS(1)=20 bytes, TBS(2)=50 bytes, TBS(3)=100 bytes, and TBS(4)=150 bytes). In this example, the demodulation reference signal (DMRS) resource configuration, time/frequency resource allocation, and modulation and coding scheme (MCS) corresponding to different TBSs may also be different.

The base station 105-a may then broadcast or multicast a group-common DCI in one or more PDCCHs 205 to schedule (for example, simultaneously schedule) multiple PDSCHs 210 (for example, $K_M$ PDSCHs, in which $1 \leq K_M \leq K$) that each include at least one of the K downlink or uplink resource configurations. For example, the group-common DCI may include scheduling information for the $K_M$ PDSCHs, in which $K_M$ is explicitly indicated to a receiving UE 115 (for example, in a master information block (MIB) or a system information block (SIB)) or implicitly indicated to the receiving UE 115 (for example, by a control channel element (CCE) resource mapping, DMRS mapping, cyclic redundancy check (CRC) masking, among other examples). In some examples, base station 105-a may broadcast the group-common DCI in one PDCCH, in which the scheduling information for different PDSCHs is included in different sub-fields in the DCI. In another example, the base station 105-a may multicast the group-common DCI in multiple PDCCHs, in which the scheduling information for different PDSCHs is included in different PDCCHs.

The group-common DCI may be transmitted using an existing DCI format or a new DCI format in a common search space (CSS) which may be monitored by all UEs 115 (for example, the UE 115-a, the UE 115-b, and the UE 115-c) expecting paging information or system information. In some examples (for example, if the new DCI format is used), the group-common DCI may include radio network temporary identifiers (RNTIs) associated with a group (for example, G-RNTIs) for the scheduled PDSCHs (for example, the $K_M$ scheduled PDSCHs). For instance, the group-common DCI may include the following G-RNTIs: {G-RNTI(1), G-RNTI(2), ..., G-RNTI($K_M$)}. In another example (for example, if an existing DCI format is used), the group-common DCI may implicitly indicate the G-RNTIs (for example, a UE 115 may derive the G-RNTIs from the resource allocation for the PDSCHs in the group-common DCI).

After the base station 105 broadcasts or multicasts the group-common DCI in the one or more PDCCHs 205, the base station 105 may multicast the $K_M$ PDSCHs 210 to $K_M$ subsets of UEs 115 (for example, including UE 115-a, UE 115-b, and UE 115-c). Each PDSCH may be scrambled with a unique G-RNTI, which, as described above, is broadcast or multicast (for example, in the group-common DCI) to a subset of UEs expecting the same downlink or uplink resource configurations. In some implementations, the number of PDSCHs scheduled may be less than the number of downlink or uplink resource configurations available for UEs 115 without RRC connections to use for communications in an inactive or idle state (for example, $K_M < K$), to reduce the overhead of group-common DCI for signaling the K resource configurations. In such cases, each scheduled PDSCH may carry one or multiple resource configurations. For instance, PDSCH n may carry $P_n$ resource configurations and may be scrambled by a G-RNTI common to $P_n$ subsets of UEs (for example, in which $1 \leq n \leq K_M$, $1 \leq K_M \leq K$, and $$\sum_{n=1}^{K_M} P_n = K).$$

Additionally or alternatively, compression of resource configurations may also be enabled (for example, by sharing some of the parameters between configurations, such as time/frequency resource allocation).

A UE 115-a, for example, may receive the group-common DCI broadcast or multicast in the one or more PDCCHs 205, and UE 115-a may decode the group-common DCI to determine the configuration information for the PDSCHs 210 including the K supported resource configurations (for example, TBS, MCS, bandwidth, among other examples). The UE 115-a may then select the PDSCH that includes the resource configuration for the UE 115-a to use for communications with the base station 105-a without an RRC connection. For instance, the UE 115-a may select the PDSCH to determine a suitable TBS, MCS, or other configuration to be used for a downlink or uplink transmission based on one or more factors or one or more selection criteria. In some examples, the group-common DCI may include information for the UE 115-a to use to select the PDSCH (for example, information associated with the multiple factors), and the UE 115-a may decode the group-common DCI to acquire the criterion assisting in the selection of the PDSCH (for example, the PDSCH that includes the appropriate resource configuration).

In some examples, the UE 115-a may select the PDSCH based on a rule preconfigured by the base station 105-a (for example, fixed for a cell group over a long period). In some examples, the UE 115-a may select the PDSCH based on a criterion (for example, cell-specific criterion) signaled by the base station 105-a (for example, based on whether the criterion satisfies a threshold). In some examples, the UE 115-a may select the PDSCH based on a link quality measurement (for example, if the link quality measured based on a synchronization signal block (SSB) satisfies a threshold). In some examples, the UE 115-a may select the PDSCH based on a buffer status, a power headroom, or a quality of service (QoS) class associated with the downlink or uplink transmission (for example, if the buffer status, power headroom, or QoS class satisfies a threshold).

The UE 115-a may then decode the selected PDSCH (for example, one out of the $K_M$ multicasting PDSCHs) that includes the resource configuration for the UE 115-a to use for communications with the base station 105-a without an RRC connection (for example, the selected or desired resource configuration, corresponding to the TBS, MCS, or other configuration of interest). For example, the UE 115-a may determine the G-RNTI associated with the PDSCH that includes the resource configuration of interest, descramble and decode the PDSCH (for example, only the PDSCH that includes the resource configuration of interest), and obtain the resource configuration carried by the PDSCH. The UE 115-a may then use the resource configuration for transmitting an uplink transmission to the base station 105-a or receiving a downlink transmission from the base station 105-a in an RRC inactive or idle state without an RRC connection.

The configurations and selection criteria described herein may be used by a plurality of UEs 115 in a non-connected state for communicating with a base station 105. If a UE 115 in an RRC connected state is communicating with a base station 105, the UE 115 may use these configurations and selection criteria if it does not have a dedicated grant and it meets the conditions for fallback to configurations used by non-connected UEs. That is, a configuration used in a non-connected state for communicating with a base station 105 may be a default or fallback configuration (for example, also used in a connected state). Further, the configuration may be a semi-persistent configuration and may be used to transmit or receive multiple data transmissions.

Figure 3:
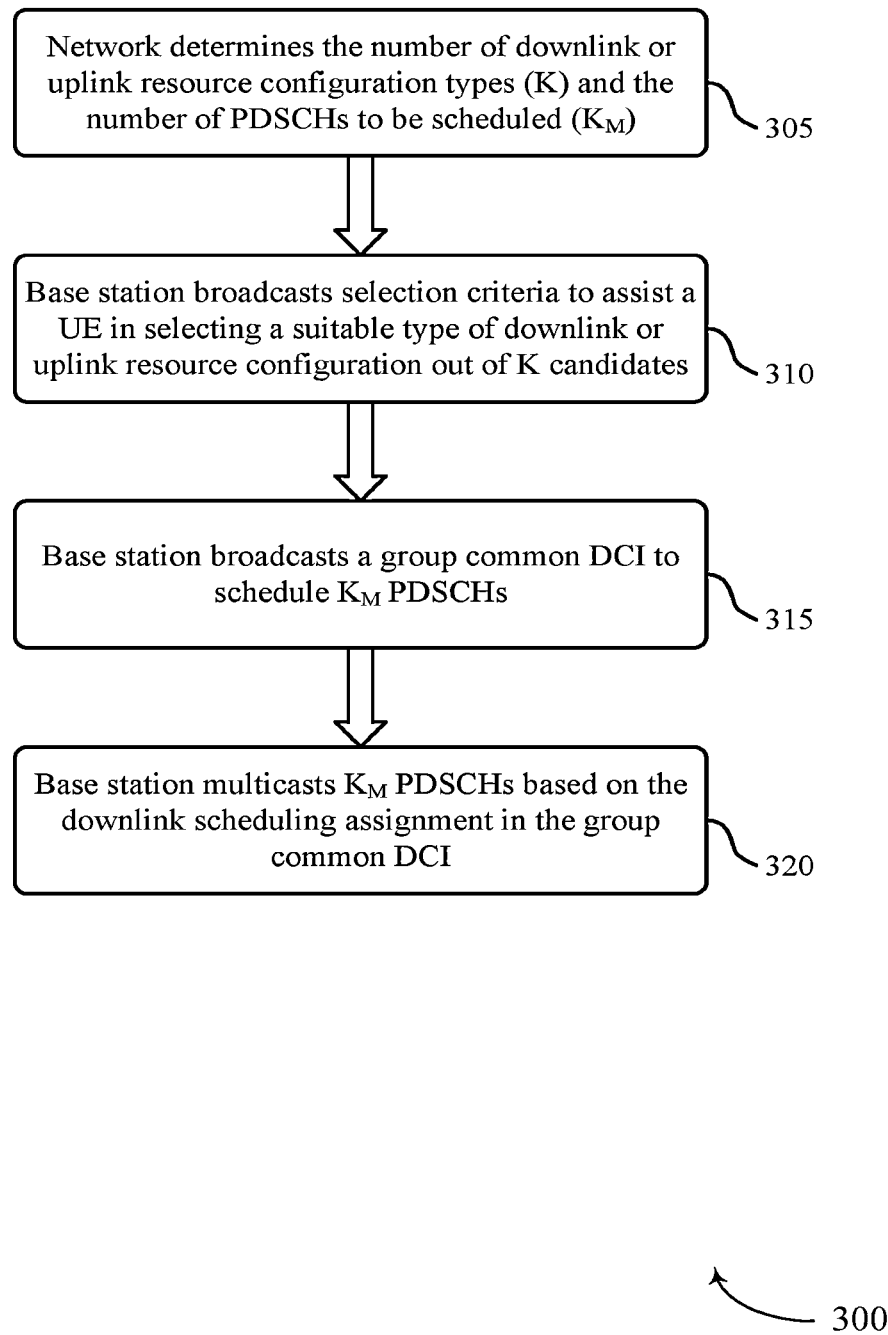
FIG. 3 illustrates a flowchart showing an example process that supports physical resource and transmission parameter configuration without an RRC connection in accordance with aspects of the present disclosure.

FIG. 3 illustrates a flowchart illustrating an example process 300 that supports physical resource and transmission parameter configuration without an RRC connection in accordance with aspects of the present disclosure. In some examples, a base station 105-a may broadcast group-common DCI in one PDCCH that schedules multiple PDSCHs. The group-common DCI includes different sub-fields that indicate the G-RNTI and scheduling information for the different PDSCHs. After broadcasting the group-common DCI, the base station 105-a may multicast the PDSCHs to a group of UEs 115. In some implementations, base station 105-a may also signal the criteria (for example, power or quality thresholds, such as a reference signal received power (RSRP) threshold, signal to interference plus noise ratio (SINR) threshold, reference signal received quality (RSRQ) threshold, threshold number of retransmissions, or a QoS class, latency requirements, among other examples) to assist a UE 115 in selecting one out of K possible resource configurations. The base station 105-a may broadcast the criteria in a different SIB or multiplex the criteria with the group-common DCI scheduling the multiple PDSCHs.

At 305, the base station 105-a (for example, the network) may determine the number of downlink or uplink resource configuration types (K) and the number of PDSCHs to be scheduled ($K_M$). At 310, the base station 105-a may broadcast the selection criteria to assist a UE 115 in selecting a suitable type of downlink or uplink resource configuration out of the K candidates. At 315, the base station 105-a may broadcast a group common DCI to schedule the $K_M$ PDSCHs. In some implementations, as mentioned above, the selection criteria and the scheduling information for the $K_M$ PDSCHs may be combined in the same DCI or may be transmitted separately. At 320, the base station 105-a may then multicast the $K_M$ PDSCHs based on the downlink scheduling assignment in the group-common DCI. In some examples, each PDSCH may be scrambled by a respective unique group RNTI and may target a subset of RRC inactive or RRC idle UEs. A UE 115 may receive the group-common DCI broadcast by the base station 105-a and may select a resource configuration for communicating without an RRC connection. For example, the UE 115 may select one of the PDSCHs scheduled by the group-common DCI based on the selection criteria broadcast by the base station 105-a at 310. The UE 115 may then decode the selected PDSCH broadcast by the base station 105-a to determine the selected resource configuration. Once the UE 115 identifies the selected resource configuration, the UE 115 may communicate with the base station 105-a using the resource configuration without an RRC connection.

Figure 4:
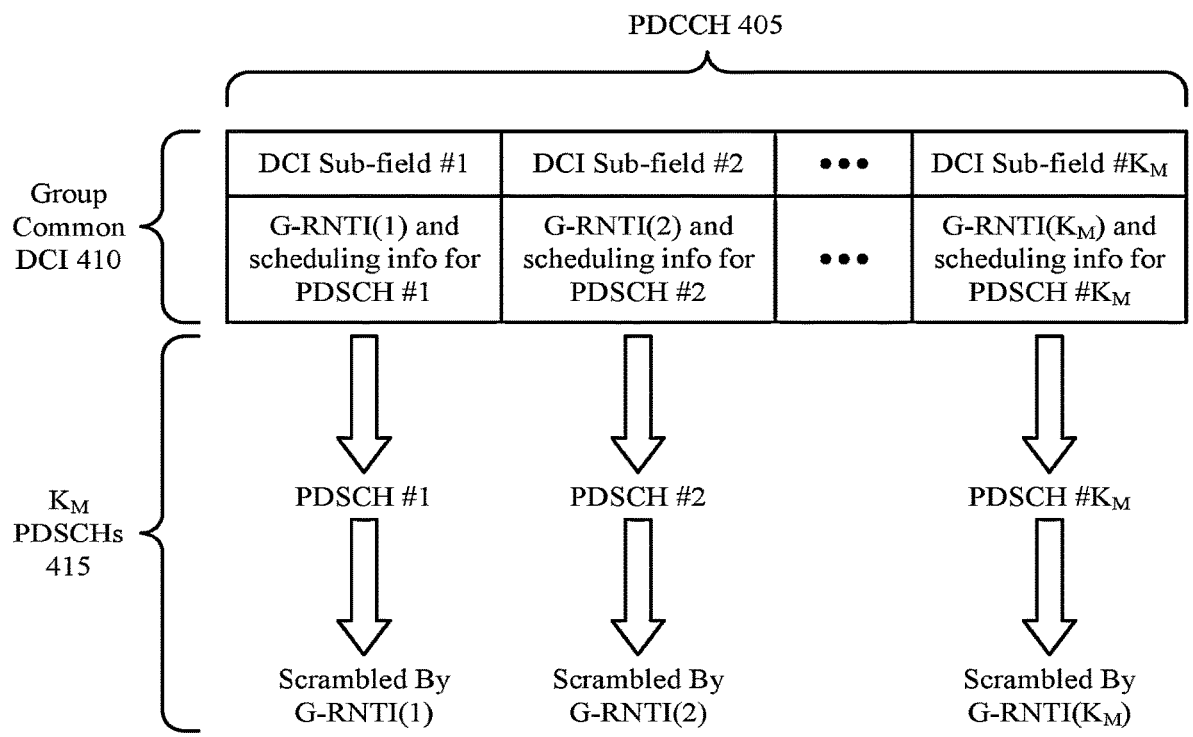
FIG. 4 illustrates an example of a messaging structure of group-common downlink control information (DCI) scheduling multiple physical downlink shared channels (PDSCHs) in accordance with aspects of the present disclosure.

FIG. 4 illustrates an example of a messaging structure 400 of group-common DCI scheduling multiple PDSCHs in accordance with aspects of the present disclosure. In some examples, a base station 105-a may transmit a single PDCCH 405 that includes a group-common DCI 410. The group-common DCI may include multiple DCI sub-fields, each including the G-RNTI and scheduling information for a corresponding PDSCH. For example, DCI sub-field 1 may include G-RNTI(1) and the scheduling information for PDSCH 1, DCI sub-field 2 may include G-RNTI(2) and the scheduling information for PDSCH 2, . . . , and DCI sub-field $K_M$ may include G-RNTI($K_M$) and the scheduling information for PDSCH $K_M$.

The base station 105-a may then transmit the $K_M$ PDSCHs 415 scheduled by the group-common DCI, in which each PDSCH is scrambled by the G-RNTI indicated in the DCI sub-field that includes the scheduling information for the PDSCH. For instance, PDSCH 1 may be scrambled by G-RNTI(1), PDSCH 2 may be scrambled by G-RNTI(2), . . . , and PDSCH $K_M$ may be scrambled by G-RNTI($K_M$). Additionally or alternatively, each PDSCH may carry a different type or a different subset of resource configurations. For instance, if the number of scheduled PDSCHs is equal to the number of resource configurations (K=$K_M$), PDSCH 1 may carry a type 1 resource configuration, PDSCH 2 may carry a type 2 resource configuration, . . . , and PDSCH $K_M$ may carry a type $K_M$ resource configuration.

In some examples, because a UE may receive a single PDCCH with multiple sub-fields for scheduling the $K_M$ PDSCHs, the decoding complexity associated with decoding the single PDCCH may be minimal (for example, when compared to decoding multiple PDCCHs). Further, the processing power associated with determining the single PDCCH in the CSS may also be limited (for example, resulting in lower power consumption at the UE).

Figure 5:
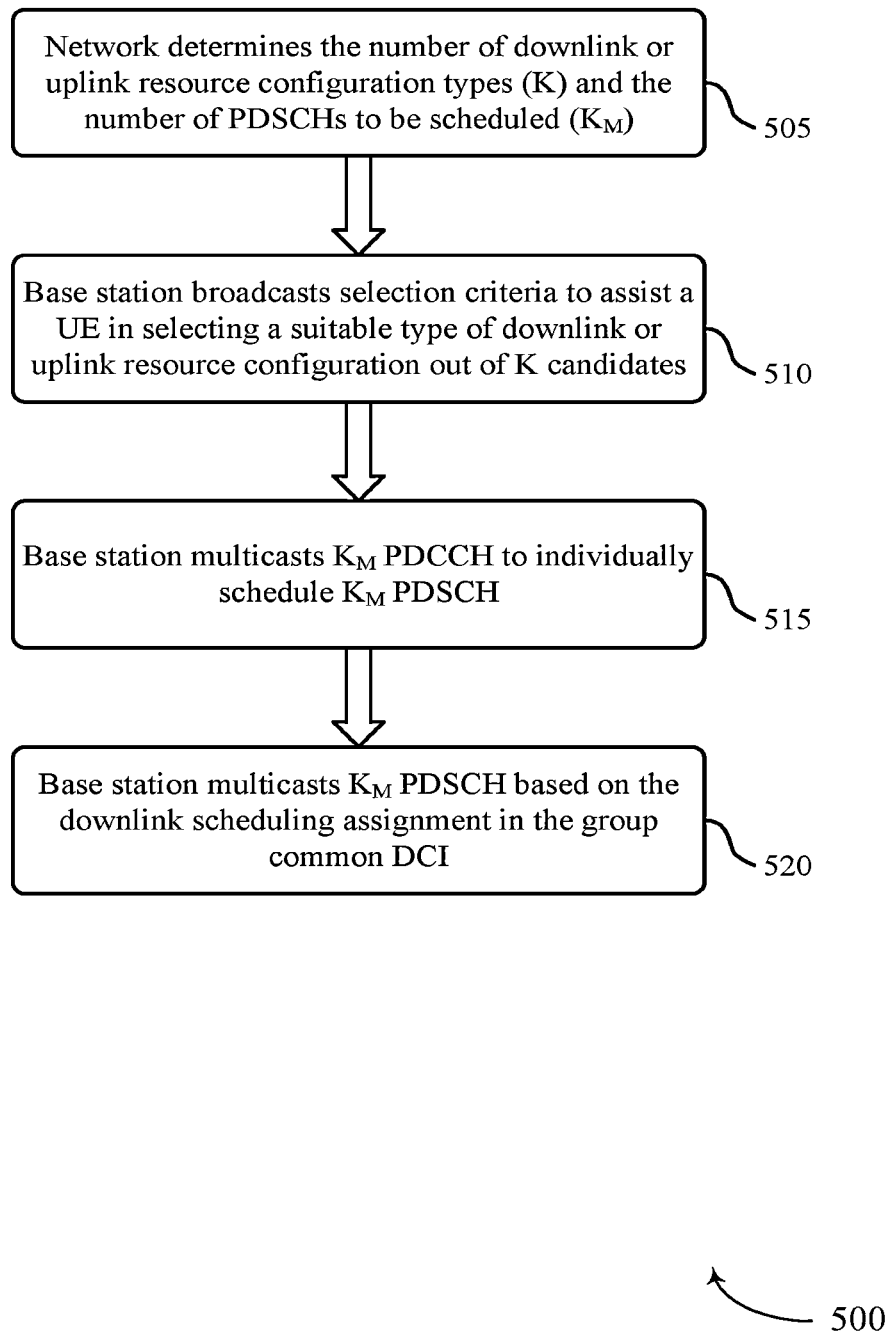
FIG. 5 illustrates a flowchart showing an example process that supports physical resource and transmission parameter configuration without an RRC connection in accordance with aspects of the present disclosure.

FIG. 5 illustrates an example of a flowchart 500 that supports physical resource and transmission parameter configuration without an RRC connection in accordance with aspects of the present disclosure. In some examples, a base station 105-a may multicast group-common DCI in multiple PDCCHs (for example, in a CSS) scheduling multiple PDSCHs, in which the group-common DCI in different PDCCHs indicate the G-RNTI and scheduling information for different PDSCHs. That is, each PDCCH may carry the scheduling information of a corresponding PDSCH. Further, the CRC of each PDCCH may be scrambled by a unique G-RNTI. After multicasting the group-common DCI, base station 105-a may multicast the PDSCHs to a group of UEs 115. Each PDSCH may carry a distinctive type of resource configuration and may be scrambled by the same G-RNTI used to scramble the PDCCH that schedules the PDSCH (for example, a G-RNTI for a subset of UEs in an RRC inactive or RRC idle state). In some implementations, the base station 105-*a* may also signal the criteria (for example, power or quality thresholds (for example, RSRP thresholds), threshold number of retransmissions, QoS class, latency requirements, among other examples) to assist a UE 115 in selecting one out of K possible resource configurations. The base station 105-*a* may broadcast the criteria in a different SIB or multiplex the criteria with the group-common DCI in each PDCCH.

At 505, the base station 105-*a* (for example, the network) may determine the number of downlink or uplink resource configuration types (K) and the number of PDSCHs to be scheduled ($K_M$). At 510, the base station 105-*a* may broadcast the selection criteria to assist a UE 115 in selecting a suitable type of downlink or uplink resource configuration out of K candidates. At 515, the base station 105-*a* may multicast $K_M$ PDCCHs to individually schedule $K_M$ PDSCHs. In some implementations, as mentioned above, the selection criteria and the scheduling information for a PDSCH may be combined in the same DCI in the same PDCCH or may be transmitted separately. At 520, the base station 105-*a* may then multicast the $K_M$ PDSCHs based on the downlink scheduling assignment in the group-common DCI in the $K_M$ PDCCHs. In some examples, each PDSCH may be scrambled by a unique group RNTI and may target a subset of RRC inactive or RRC idle UEs.

A UE 115 may receive the group-common DCI in multiple PDCCHs and may decode the multiple PDCCHs to detect the supported resource configuration. For example, the UE 115 may select a resource configuration for communicating without an RRC connection and may determine the PDCCH that includes the scheduling information for a PDSCH that includes the selected resource configuration. In some implementations, the number of PDCCHs transmitted in the same CSS may be explicitly indicated to the UE 115 by the base station 105-*a* in paging information or system information. Then, the UE 115 may decode the PDSCH that includes the selected resource configuration based on the scheduling information in a corresponding PDCCH to determine the selected resource configuration. Once the UE 115 identifies the selected resource configuration, the UE 115 may communicate with the base station 105-*a* using the resource configuration without an RRC connection.

Figure 6:
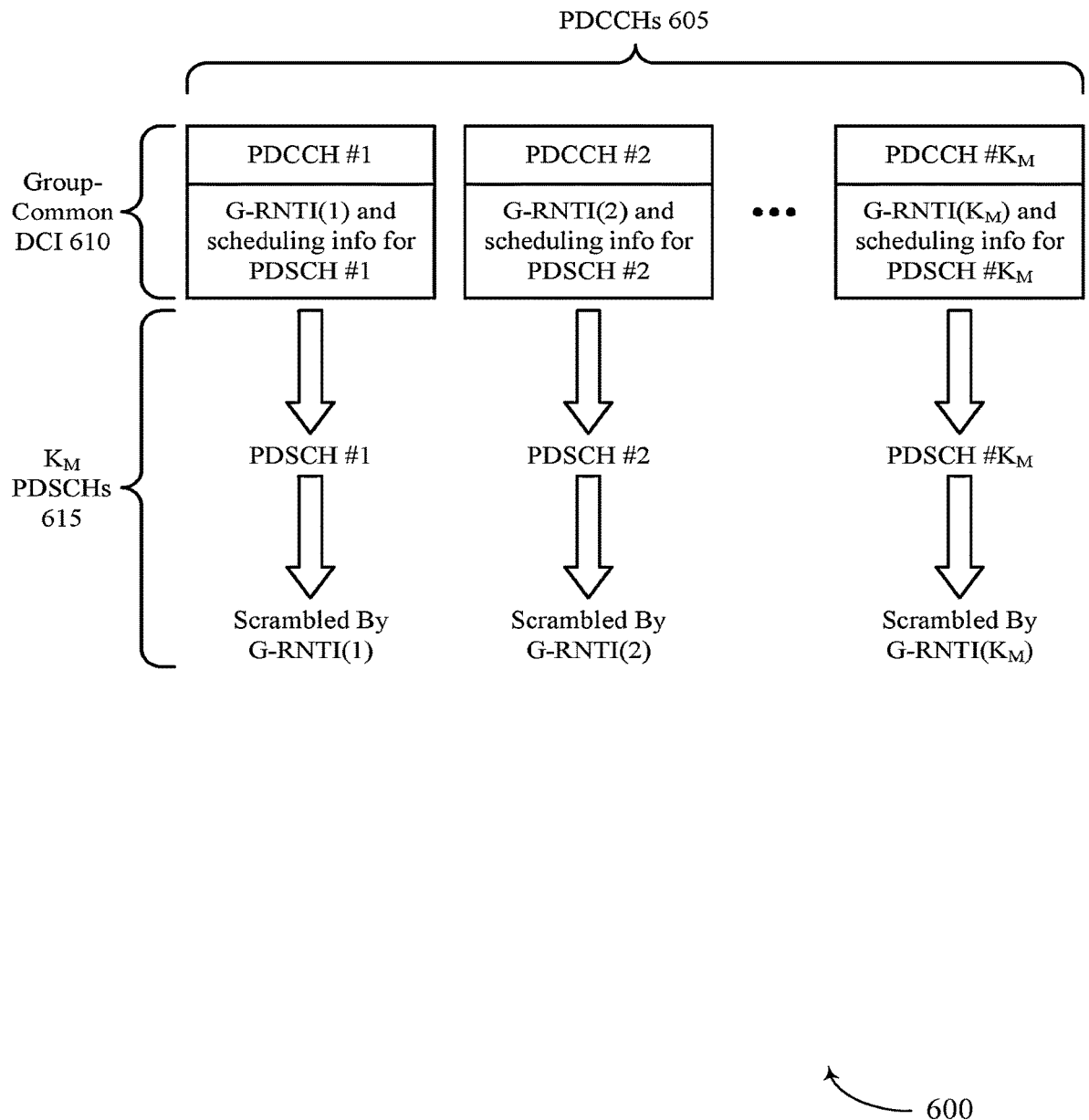
FIG. 6 illustrates an example of a messaging structure of group-common DCI scheduling multiple PDSCHs in accordance with aspects of the present disclosure.

FIG. 6 illustrates an example of a messaging structure 600 that supports physical resource and transmission parameter configuration without an RRC connection in accordance with aspects of the present disclosure. In some examples, a base station 105-*a* may transmit multiple PDCCHs 605 that include a group-common DCI 610. The group-common DCI in each PDCCH may include scheduling information for a corresponding PDSCH and may be scrambled using the same G-RNTI as the corresponding PDSCH (for example, in which the base station 105-*a* may signal the G-RNTIs used to scramble the multiple PDCCHs 605 to a UE 115). For example, the group-common DCI in PDCCH 1 may include G-RNTI(1) and the scheduling information for PDSCH 1, the group-common DCI in PDCCH 2 may include G-RNTI (2) and the scheduling information for PDSCH 2, . . . , and the group-common DCI in PDCCH $K_M$ may include G-RNTI(1) and the scheduling information for PDSCH $K_M$.

The base station 105-*a* may then transmit the $K_M$ PDSCHs 615 scheduled by the group-common DCI 610 in the multiple PDCCHs 605, in which each PDSCH is scrambled by the same G-RNTI used to scramble the PDCCH that schedules the PDSCH. For instance, PDSCH 1 may be scrambled by G-RNTI(1), PDSCH 2 may be scrambled by G-RNTI(2), . . . , and PDSCH $K_M$ may be scrambled by G-RNTI($K_M$). Additionally or alternatively, each PDSCH may carry a different type or a different subset of resource configurations. For instance, if the number of scheduled PDSCHs is equal to the number of resource configurations (K=$K_M$), PDSCH 1 may carry a type 1 resource configuration, PDSCH 2 may carry a type 2 resource configuration, . . . , and PDSCH $K_M$ may carry a type $K_M$ resource configuration.

In some examples, because a base station may transmit $K_M$ PDCCHs for scheduling the $K_M$ PDSCHs, the base station may have flexibility to increase the number of configurations (K) to provide to UEs. Specifically, because the group common DCI may be transmitted across multiple PDCCHs rather than in a single PDCCH whose payload size may be limited by the link budget of a cell edge UE, the base station may be able to signal multiple configurations to UEs without being as restricted by payload size as in the case in which a single PDCCH is used (for example, as described with reference to FIG. 4).

Figure 7:
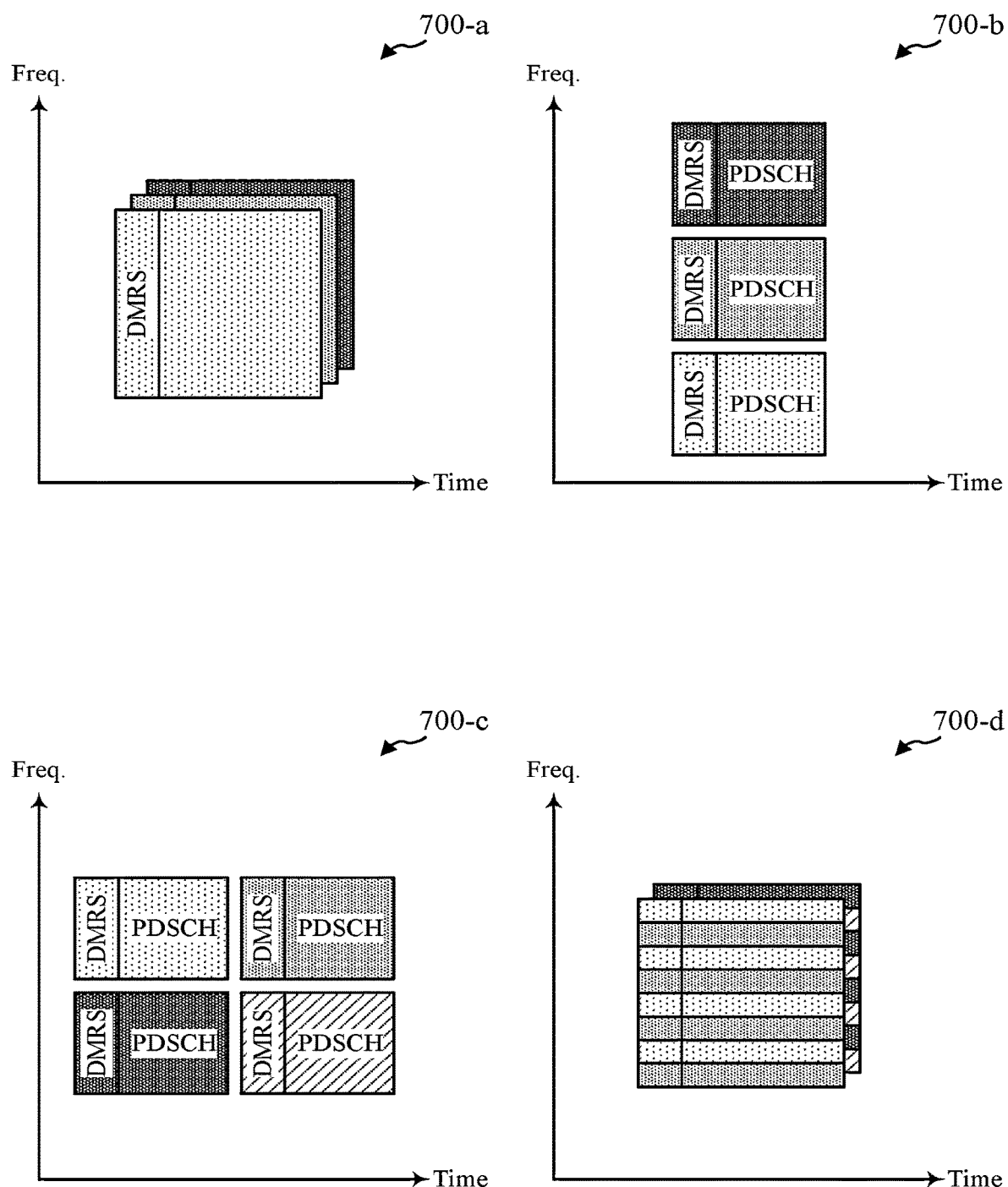
FIG. 7 illustrates an example of PDSCH or physical downlink control channel (PDCCH) multiplexing in accordance with aspects of the present disclosure.

FIG. 7 illustrates an example of PDSCH or PDCCH multiplexing 700 in accordance with aspects of the present disclosure. In a first example 700-*a*, a base station 105 may use code division multiplexing (CDM) to multiplex $K_M$ PDSCHs or PDCCHs for transmission to a UE 115. In this example, $K_M$ orthogonal DMRS ports may be mapped to $K_M$ PDSCHs or PDCCHs, or $K_M$ orthogonal cover codes (OCCs) or spreading codes may be assigned to $K_M$ PDSCHs or PDCCHs. In a second example 700-*b*, a base station 105 may use frequency division multiplexing (FDM) to multiplex $K_M$ PDSCHs or PDCCHs for transmission to a UE 115. In this example, $K_M$ orthogonal sub-bands in the frequency domain may be assigned to $K_M$ PDSCHs or PDCCHs (for example, with DMRS included). In a third example 700-*c*, a base station 105 may use hybrid FDM and time division multiplexing (TDM) to multiplex $K_M$ PDSCHs or PDCCHs for transmission to a UE 115. In a fourth example 700-*d*, a base station 105 may use hybrid FDM and CDM to multiplex $K_M$ PDSCHs or PDCCHs for transmission to a UE 115. In this example, a pair of PDSCHs or PDCCHs may be mapped to interlaced resource elements (for example, two times interlaced resource element mapping) in the frequency domain, and $K_M/2$ spreading codes or OCCs may be used to multiplex the different pairs of PDSCHs or PDCCHs.

Figure 8:
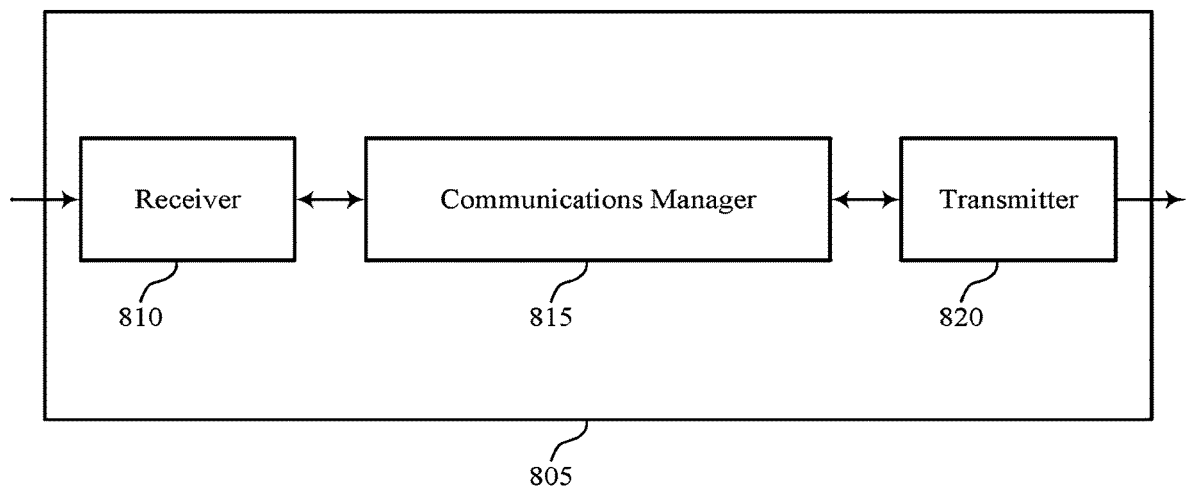
FIGS. 8 and 9 show block diagrams of devices that support physical resource and transmission parameter configuration without an RRC connection in accordance with aspects of the present disclosure.

FIG. 8 shows a block diagram of a device 805 that supports physical resource and transmission parameter configuration without an RRC connection in accordance with aspects of the present disclosure. The device 805 may be an example of aspects of a UE 115. The device 805 may include a receiver 810, a communications manager 815, and a transmitter 820. The communications manager 815 can be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to physical resource and transmission parameter configuration without an RRC connection, among other examples). The receiver 810 may pass the received information, or information derived from it, to other components of the device 805. The receiver 810 may be an example of aspects of the transceiver 1120 described with reference to FIG. 11. The receiver 810 may utilize a single antenna or a set of antennas.

The communications manager 815 may receive, in the non-connected state, group common downlink control information in one or more group common downlink control channels including a first group common downlink control channel. The one or more group common downlink control channels schedule a set of downlink data channels, each downlink data channel indicating at least a respective configuration of physical resources and transmission parameters usable for grant-free uplink transmission. The communications manager 815 may then determine, in the non-connected state, scheduling information and a group radio network temporary identifier for a first downlink data channel of the set of downlink data channels based on the group common downlink control information received in the first group common downlink control channel, and the communications manager 815 may receive, in the non-connected state in the first downlink data channel according to the identified scheduling information and the group radio network temporary identifier, a first configuration of physical resources and transmission parameters to be used for a grant-free uplink transmission of one or more of a preamble, control information, or data. The communications manager 815 may transmit, in the non-connected state, a grant-free uplink transmission to the base station based on the first configuration of physical resources and transmission parameters.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

The communications manager 815 as described may be implemented to realize one or more potential advantages. Some implementations may allow the device 805 to receive one or more configurations indicating physical resources or transmitter configurations. Based on receiving the configurations, the device 805 may receive or transmit data while in an inactive or idle state. As such, the device 805 may exhibit a decreased signaling overhead and an increased system throughput and utilization efficiency. In some implementations, the device 805 may experience a high reliability for uplink communications, spectral efficiency, higher data rates, among other benefits.

Figure 9:
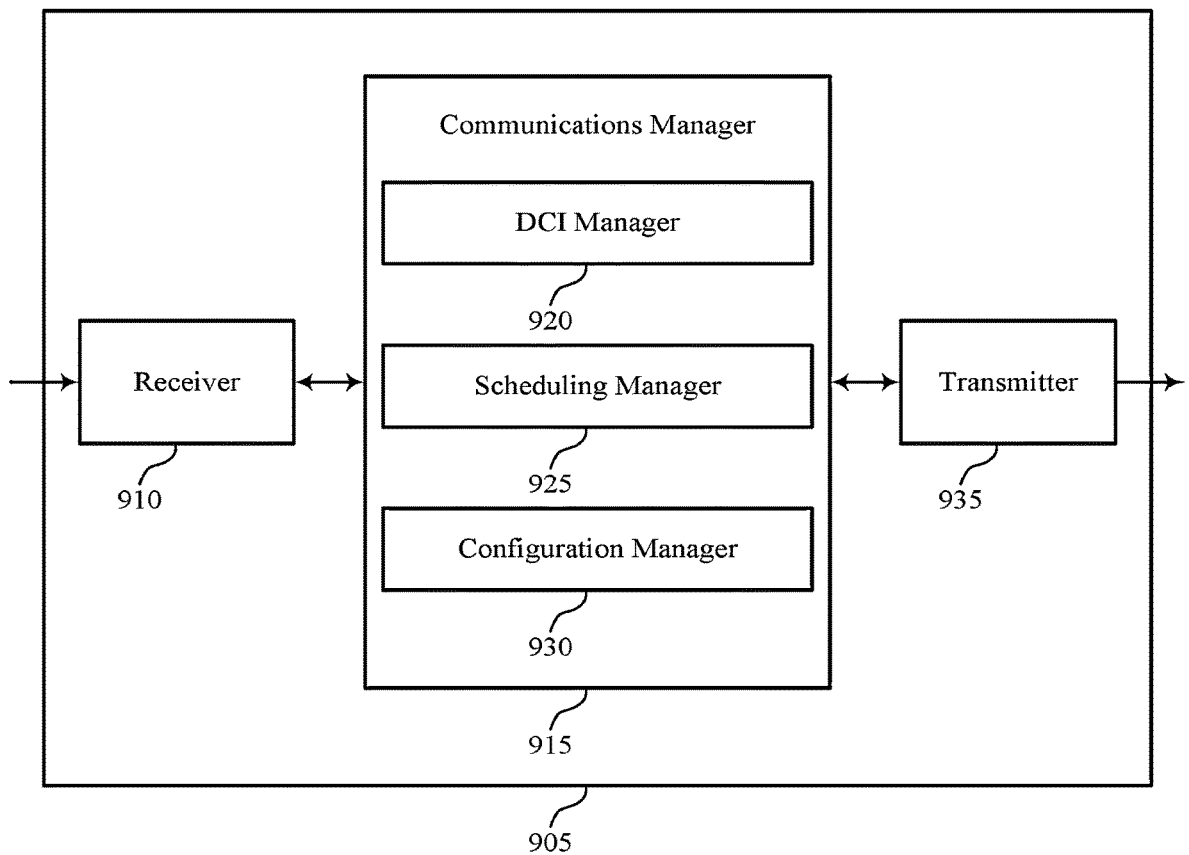

FIG. 9 shows a block diagram of a device 905 that supports physical resource and transmission parameter configuration without an RRC connection in accordance with aspects of the present disclosure. The device 905 may be an example of aspects of a device 805, or a UE 115. The device 905 may include a receiver 910, a communications manager 915, and a transmitter 935. The communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to physical resource and transmission parameter configuration without an RRC connection, among other examples). The receiver 910 may pass the received information, or information derived from it, to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815. The communications manager 915 may include a DCI manager 920, a scheduling manager 925, and a configuration manager 930.

The DCI manager 920 may receive, in the non-connected or the connected state, group common downlink control information in one or more group common downlink control channels including a first group common downlink control channel, the one or more group common downlink control channels scheduling a set of downlink data channels, each downlink data channel indicating at least a respective configuration of physical resources and transmission parameters usable for grant-free uplink transmission. The scheduling manager 925 may determine, in the non-connected or the connected state, scheduling information and a group radio network temporary identifier for a first downlink data channel of the set of downlink data channels based on the group common downlink control information received in the first group common downlink control channel. The configuration manager 930 may receive, in the non-connected state or the connected state in the first downlink data channel according to the identified scheduling information and the group radio network temporary identifier, a first configuration of physical resources and transmission parameters to be used for a grant-free uplink transmission of one or more of a preamble, control information, or data. the communications manager 915 may then transmit, in the non-connected state or the connected state, a grant-free uplink transmission to the base station based on the first configuration of physical resources and transmission parameters.

The transmitter 935 may transmit signals generated by other components of the device 905. In some examples, the transmitter 935 may be collocated with a receiver 910 in a transceiver component. For example, the transmitter 935 may be an example of aspects of the transceiver 1120 described with reference to FIG. 11. The transmitter 935 may utilize a single antenna or a set of antennas.

Figure 10:
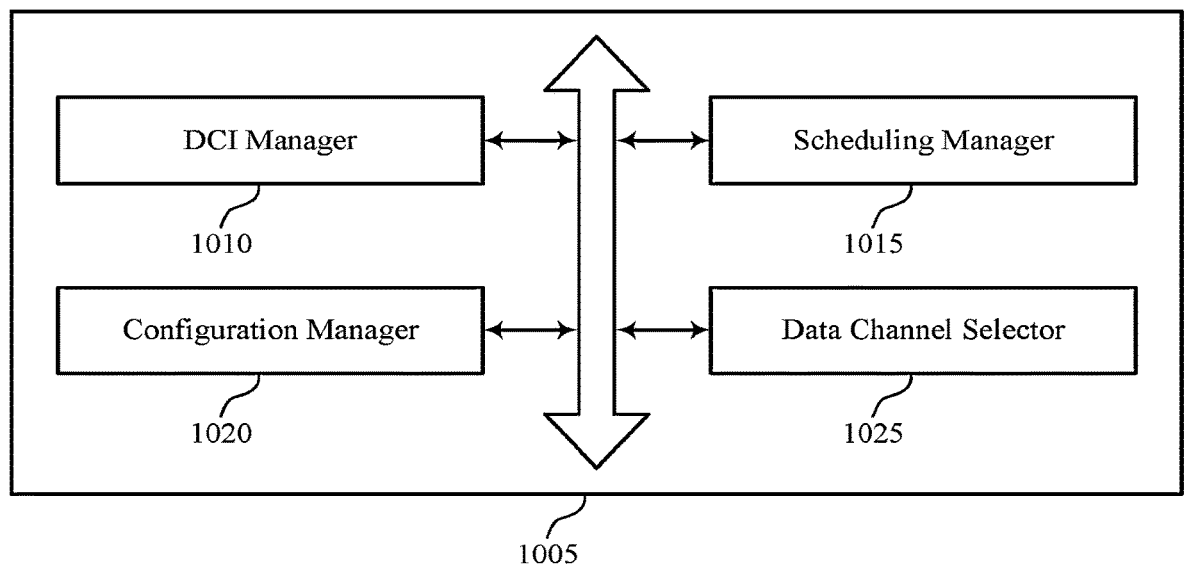
FIG. 10 shows a block diagram of a communications manager that supports physical resource and transmission parameter configuration without an RRC connection in accordance with aspects of the present disclosure.

FIG. 10 shows a block diagram of a communications manager 1005 that supports physical resource and transmission parameter configuration without an RRC connection in accordance with aspects of the present disclosure. The communications manager 1005 may be an example of aspects of a communications manager 815, a communications manager 915, or a communications manager 1110 described herein. The communications manager 1005 may include a DCI manager 1010, a scheduling manager 1015, a configuration manager 1020, and a data channel selector 1025. Each of these components may communicate, directly or indirectly, with one another (for example, via one or more buses).

The DCI manager 1010 may receive, in the non-connected state, group common downlink control information in one or more group common downlink control channels including a first group common downlink control channel, the one or more group common downlink control channels scheduling a set of downlink data channels, each downlink data channel indicating at least a respective configuration of physical resources and transmission parameters usable for grant-free uplink transmission. The scheduling manager 1015 may determine, in the non-connected state, scheduling information and a group radio network temporary identifier for a first downlink data channel of the set of downlink data channels based on the group common downlink control information received in the first group common downlink control channel. The configuration manager 1020 may receive, in the non-connected state in the first downlink data channel according to the identified scheduling information and the group radio network temporary identifier, a first configuration of physical resources and transmission parameters to be used for a grant-free uplink transmission of one or more of a preamble, control information, or data. The communications manager 1005 may then transmit, in the non-connected state, a grant-free uplink transmission to the base station based on the first configuration of physical resources and transmission parameters.

The data channel selector 1025 may determine one or more selection criteria associated with a with the respective configurations of physical resources and transmission parameters indicated by the set of downlink data channels. In some examples, the data channel selector 1025 may select the first data channel that includes the first configuration of physical resources and transmission parameters based on the identified one or more selection criteria. In some examples, the data channel selector 1025 may receive an indication of the one or more selection criteria in the group common downlink control information or in an information block different than the group common downlink control information. In some implementations, the one or more selection criteria include one or more of a reference signal power threshold, a reference signal strength threshold, a reference signal quality threshold, a cell-specific parameter associated with the base station, a buffer status, a power head room, or a quality of service class. In some implementations, each downlink data channel of the plurality of downlink data channels is scrambled using a respective group radio network temporary identifier of a plurality of group radio network temporary identifiers, and the plurality of group radio network temporary identifiers are received in the group common downlink control information or in an information block different than the group common downlink control information. In some implementations, the plurality of downlink data channels are scrambled using the plurality of group radio network temporary identifiers.

In some examples, the DCI manager 1010 may receive, in the group common downlink control information, an indication of a number of the set of downlink data channels scheduled by the group common downlink control information. In some examples, the DCI manager 1010 may receive a master information block or a system information block including an indication of a number of the one or more group common downlink control channels including the group common downlink control information. In some implementations, a number of the set of downlink data channels scheduled by the group common downlink control information is implicitly indicated by one or more of a control channel element resource mapping, a demodulation reference signal mapping, or a cyclic redundancy check masking. In some implementations, the group common downlink control information includes a first downlink control information subfield that includes at least the scheduling information and the group radio network temporary identifier for the first downlink data channel and a second downlink control information subfield that includes at least scheduling information and a group radio network temporary identifier for a second downlink data channel of the set of downlink data channels.

In some implementations, the first downlink control information subfield and the second downlink control information subfield of the group common downlink control information are mapped to a first group common downlink control channel and a second group common downlink control channel, respectively, which are multicast in a common search space configured in an initial downlink bandwidth part. In some implementations, the first downlink control information subfield and the second downlink control information are aggregated and mapped to a same group common downlink control channel, which is multicast in a common search space configured in an initial downlink bandwidth part.

In some examples, the DCI manager 1010 may receive the first downlink control information subfield of the group common downlink control information and extract the scheduling information and the first group radio network temporary identifier used to scramble the first downlink data channel of the set of downlink data channels. In some examples, the DCI manager 1010 may receive the second downlink control information subfield of the group common downlink control information and extract the scheduling information and the group radio network temporary for the second downlink data channel identifier used to scramble the second downlink data channel of the set of downlink data channels.

In some implementations, the set of downlink data channels are multiplexed based on a multiplexing scheme comprising one or more of code division multiplexing, frequency division multiplexing, space division multiplexing, or time division multiplexing. In some implementations, scheduling information of the group common downlink control information scheduling information of the group common downlink control information indicates the multiplexing scheme. In some implementations, the non-connected state includes one or more of an RRC idle state or an RRC inactive state. In some examples, the two configurations of physical resources and transmission parameters are associated with one or more of different transport block sizes, different demodulation reference signal resource configurations, different time and frequency resource allocations, different modulation and coding schemes, different frequency hopping schemes, different slot aggregation schemes, different repetition schemes, different waveforms, different hybrid automatic repeat request parameters, different power control parameters, different sharing patterns of preamble occasions and sequences between two-step and four-step random access procedures, different patterns and periodicities for an association of synchronization signal blocks (SSB) with preamble occasions and sequences, different length of random access response windows, different control resource sets or search spaces for random access response messages, or different bandwidth part configurations. In some implementations, the first configuration includes one or more of a semi-persistent configuration, a default configuration, or a fallback configuration, usable by UEs in non-connected state and connected state.

Figure 11:
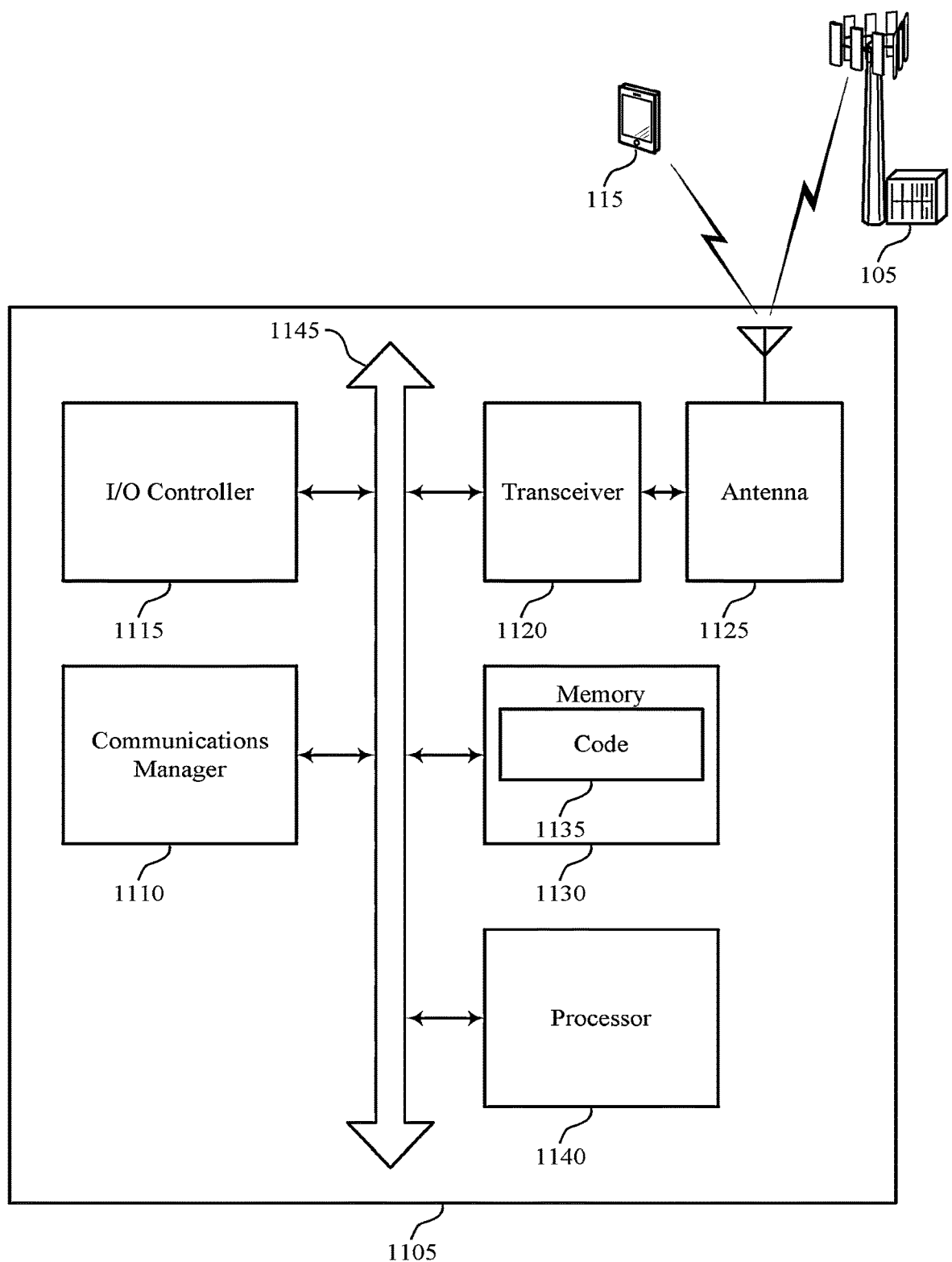
FIG. 11 shows a diagram of a system including a device that supports physical resource and transmission parameter configuration without an RRC connection in accordance with aspects of the present disclosure.

FIG. 11 shows a diagram of a system including a device 1105 that supports physical resource and transmission parameter configuration without an RRC connection in accordance with aspects of the present disclosure. The device 1105 may be an example of or include the components of device 805, device 905, or a UE 115. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (for example, bus 1145).

The communications manager 1110 may receive, in the non-connected state, group common downlink control information in one or more group common downlink control channels including a first group common downlink control channel, the one or more group common downlink control channels scheduling a set of downlink data channels, each downlink data channel indicating at least a respective configuration of physical resources and transmission parameters usable for grant-free uplink transmission. The communications manager 1110 may then determine, in the non-connected state, scheduling information and a group radio network temporary identifier for a first downlink data channel of the set of downlink data channels based on the group common downlink control information received in the first group common downlink control channel, and the communications manager 1110 may receive, in the non-connected state in the first downlink data channel according to the identified scheduling information and the group radio network temporary identifier, a first configuration of physical resources and transmission parameters to be used for a grant-free uplink transmission of one or more of a preamble, control information, or data. The communications manager 1110 may transmit, in the non-connected state, a grant-free uplink transmission to the base station based on the first configuration of physical resources and transmission parameters.

The I/O controller 1115 may manage input and output signals for the device 1105. The I/O controller 1115 may also manage peripherals not integrated into the device 1105. In some implementations, the I/O controller 1115 may represent a physical connection or port to an external peripheral. In some implementations, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some implementations, the I/O controller 1115 may be implemented as part of a processor. In some implementations, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some implementations, the wireless device may include a single antenna 1125. However, In some implementations the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some implementations, the memory 1130 may contain, among other things, a basic input/output system (BIOS) which may control basic hardware or software operation such as the interaction with peripheral components or devices.

The processor 1140 may include an intelligent hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some implementations, the processor 1140 may be configured to operate a memory array using a memory controller. In other cases, a memory controller may be integrated into the processor 1140. The processor 1140 may be configured to execute computer-readable instructions stored in a memory (for example, the memory 1130) to cause the device 1105 to perform various functions (for example, functions or tasks supporting physical resource and transmission parameter configuration without an RRC connection).

The code 1135 may include instructions to implement aspects of the present disclosure, including instructions to support wireless communications. The code 1135 may be stored in a non-transitory computer-readable medium such as system memory or other type of memory. In some implementations, the code 1135 may not be directly executable by the processor 1140 but may cause a computer (for example, when compiled and executed) to perform functions described herein.

Figure 12:
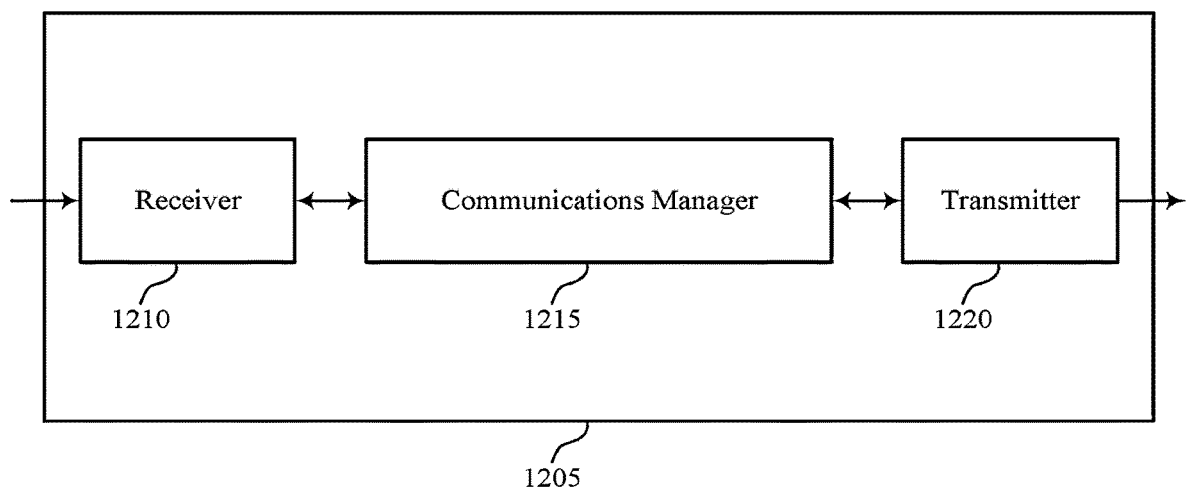
FIGS. 12 and 13 show block diagrams of devices that support physical resource and transmission parameter configuration without an RRC connection in accordance with aspects of the present disclosure.

FIG. 12 shows a block diagram of a device 1205 that supports physical resource and transmission parameter configuration without an RRC connection in accordance with aspects of the present disclosure. The device 1205 may be an example of aspects of a base station 105. The device 1205 may include a receiver 1210, a communications manager 1215, and a transmitter 1220. The communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to physical resource and transmission parameter configuration without an RRC connection, among other examples). The receiver 1210 may pass the received information, or information derived from it, to other components of the device 1205. The receiver 1210 may be an example of aspects of the transceiver 1520 described with reference to FIG. 15. The receiver 1210 may utilize a single antenna or a set of antennas.

The communications manager 1215 may determine a set of configurations of physical resources and transmission parameters usable by a plurality of user equipment (UEs) to use, while operating in a non-connected state, for a grant-free uplink transmission to the base station. The communications manager 1215 may transmit, in one or more group common downlink control channels, group common downlink control information including at least scheduling information and a group radio network temporary identifier for each of for a set of downlink data channels, and the communications manager 1215 may scramble each of the set of downlink data channels with a respective group radio network temporary identifier. The communications manager 1215 may multicast, in each downlink data channel of the set of downlink data channels, a configuration of physical resources and transmission parameters of the set of configurations for a subset of the set of UEs according to the scheduling information transmitted in the group common downlink control channels. The communications manager 1215 may multiplex each downlink data channel with other downlink data channels of the plurality of downlink data channels scheduled by the one or more group common downlink control channels based on a multiplexing scheme comprising one or more of code division multiplexing, frequency division multiplexing, space division multiplexing, or time division multiplexing, in which a multiplexing scheme is included in the scheduling information for the plurality of downlink data channels.

The communications manager 1215, or its sub-components, may be implemented in hardware, code (for example, software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver component. For example, the transmitter 1220 may be an example of aspects of the transceiver 1520 described with reference to FIG. 15. The transmitter 1220 may utilize a single antenna or a set of antennas.

Figure 13:
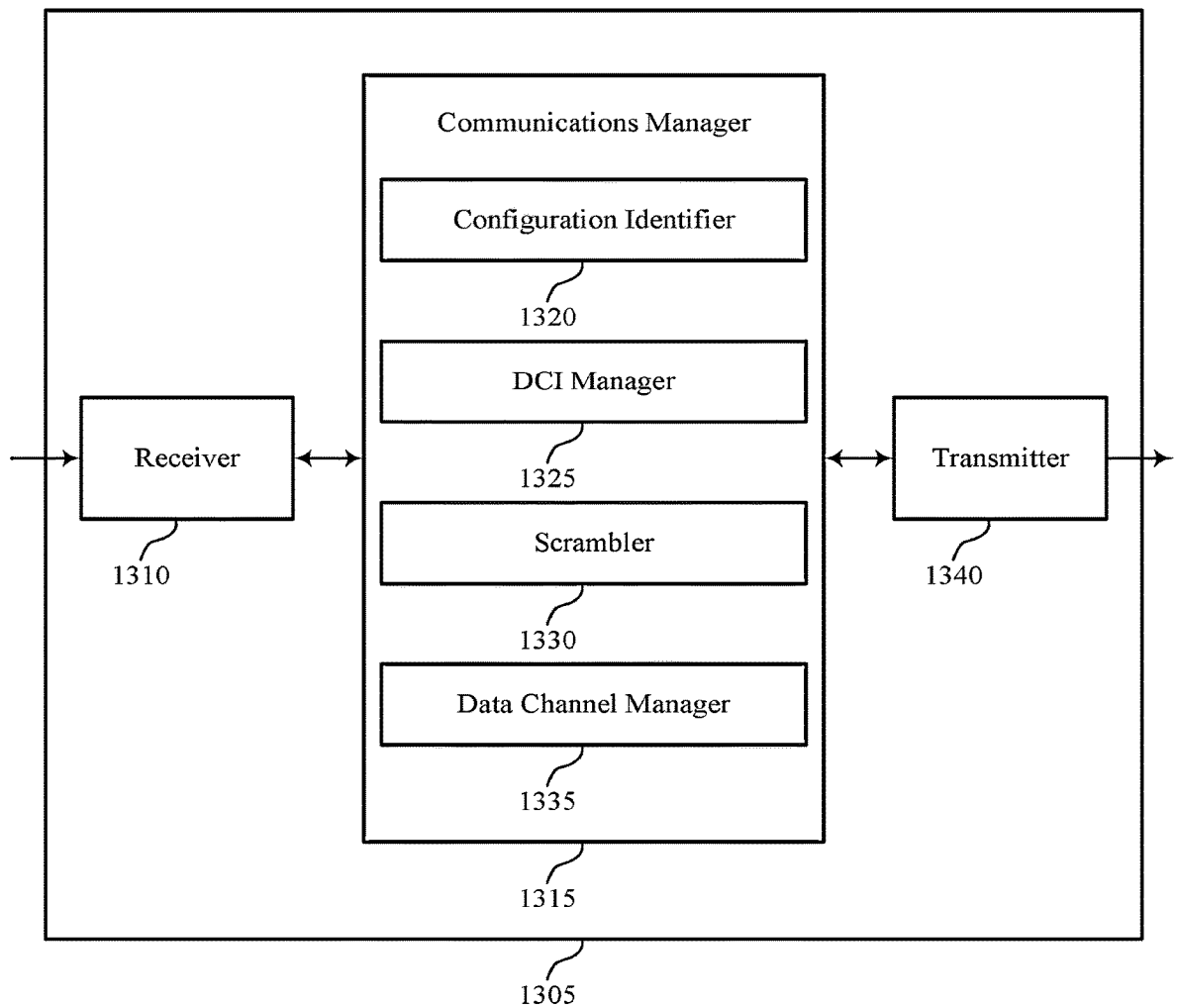

FIG. 13 shows a block diagram of a device 1305 that supports physical resource and transmission parameter configuration without an RRC connection in accordance with aspects of the present disclosure. The device 1305 may be an example of aspects of a device 1205, or a base station 105. The device 1305 may include a receiver 1310, a communications manager 1315, and a transmitter 1340. The communications manager 1315 can be implemented, at least in part, by one or both of a modem and a processor. Each of these components may be in communication with one another (for example, via one or more buses).

The receiver 1310 may receive information such as packets, user data, or control information associated with various information channels (for example, control channels, data channels, and information related to physical resource and transmission parameter configuration without an RRC connection, among other examples). The receiver 1310 may pass the received information, or information derived from it, to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215. The communications manager 1315 may include a configuration identifier 1320, a DCI manager 1325, a scrambler 1330, and a data channel manager 1335.

The configuration identifier 1320 may determine a set of configurations of physical resources and transmission parameters usable by a plurality of user equipment (UEs) to use, while operating in a non-connected state, for a grant-free uplink transmission to the base station. The DCI manager 1325 may transmit, in one or more group common downlink control channels, group common downlink control information including at least scheduling information and a group radio network temporary identifier for each of for a set of downlink data channels. The scrambler 1330 may scramble each of the set of downlink data channels with a respective group radio network temporary identifier. The data channel manager 1335 may multicast, in each downlink data channel of the set of downlink data channels, a configuration of physical resources and transmission parameters of the set of configurations for a subset of the set of UEs according to the scheduling information transmitted in the group common downlink control channels. The data channel manager 1335 may also multiplex each downlink data channel with other downlink data channels of the plurality of downlink data channels scheduled by the one or more group common downlink control channels based on a multiplexing scheme comprising one or more of code division multiplexing, frequency division multiplexing, space division multiplexing, or time division multiplexing, where a multiplexing scheme is included in the scheduling information for the plurality of downlink data channels.

The transmitter 1340 may transmit signals generated by other components of the device 1305. In some examples, the transmitter 1340 may be collocated with a receiver 1310 in a transceiver component. For example, the transmitter 1340 may be an example of aspects of the transceiver 1520 described with reference to FIG. 15. The transmitter 1340 may utilize a single antenna or a set of antennas.

Figure 14:
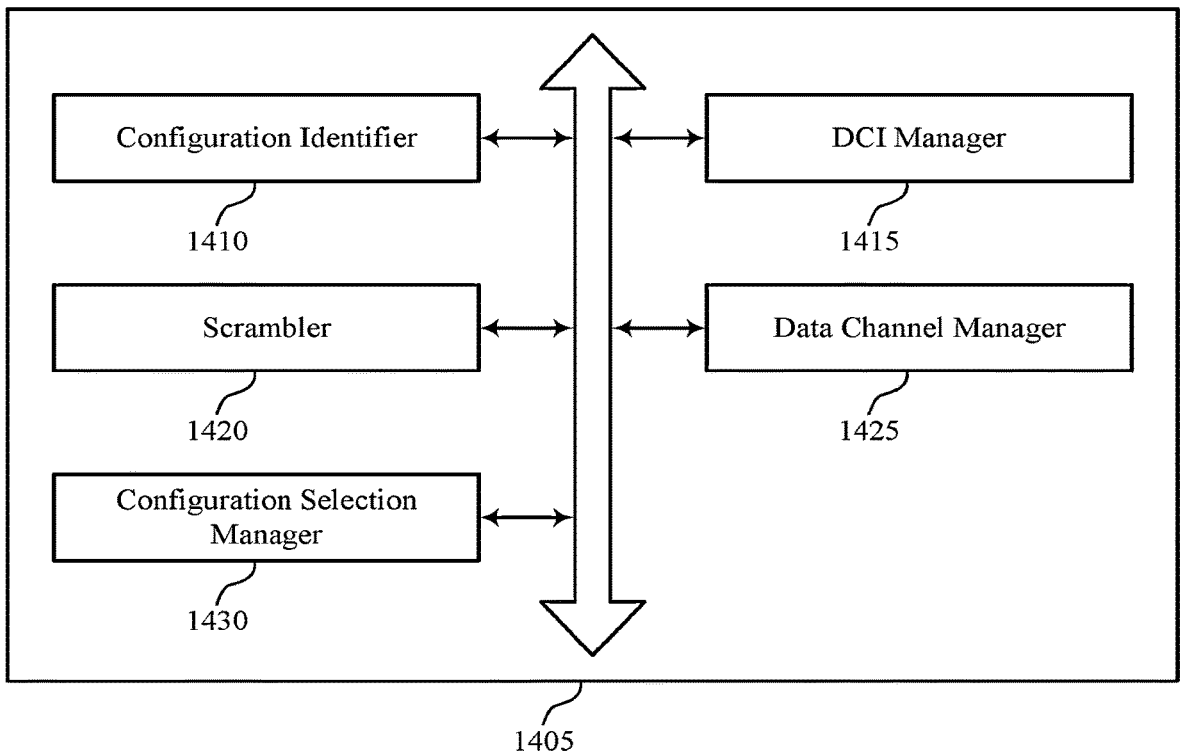
FIG. 14 shows a block diagram of a communications manager that supports physical resource and transmission parameter configuration without an RRC connection in accordance with aspects of the present disclosure.

FIG. 14 shows a block diagram of a communications manager 1405 that supports physical resource and transmission parameter configuration without an RRC connection in accordance with aspects of the present disclosure. The communications manager 1405 may be an example of aspects of a communications manager 1215, a communications manager 1315, or a communications manager 1510 described herein. The communications manager 1405 may include a configuration identifier 1410, a DCI manager 1415, a scrambler 1420, a data channel manager 1425, and a configuration selection manager 1430. Each of these components may communicate, directly or indirectly, with one another (for example, via one or more buses).

The configuration identifier 1410 may determine a set of configurations of physical resources and transmission parameters usable by a plurality of user equipment (UEs) to use, while operating in a non-connected state, for a grant-free uplink transmission to the base station. The DCI manager 1415 may transmit, in one or more group common downlink control channels, group common downlink control information including at least scheduling information and a group radio network temporary identifier for each of for a set of downlink data channels. The scrambler 1420 may scramble each of the set of downlink data channels with a respective group radio network temporary identifier. The data channel manager 1425 may multicast, in each downlink data channel of the set of downlink data channels, a configuration of physical resources and transmission parameters of the set of configurations for a subset of the set of UEs according to the scheduling information transmitted in the group common downlink control channels. The data channel manager 1425 may also multiplex each downlink data channel with other downlink data channels of the plurality of downlink data channels scheduled by the one or more group common downlink control channels based on a multiplexing scheme comprising one or more of code division multiplexing, frequency division multiplexing, space division multiplexing, or time division multiplexing, where a multiplexing scheme is included in the scheduling information for the plurality of downlink data channels.

The configuration selection manager 1430 may transmit one or more selection criteria associated with the set of configurations, the one or more selection criteria being for the set of UEs to use to select from the set of configurations. In some implementations, the one or more selection criteria or the set of group radio network temporary identifiers used to scramble the set of downlink data channels are transmitted together with the group common downlink control information. In some implementations, the one or more selection criteria are transmitted in an information block separately from the group common downlink control information. In some implementations, the one or more selection criteria include one or more of a reference signal power threshold, or reference signal strength threshold, or a reference signal quality threshold, or a cell-specific parameter associated with the base station, or a buffer status, or a power head room, or a quality of service class.

In some examples, the configuration selection manager 1430 may broadcast the one or more selection criteria for the set of UEs in non-connected state and connected state. In some examples, the DCI manager 1415 may transmit, in the group common downlink control information, an indication of a number of the set of downlink data channels scheduled by the group common downlink control information. In some examples, the DCI manager 1415 may transmit a master information block or a system information block including the indication of the number of the set of downlink data channels. In some implementations, a number of the set of downlink data channels scheduled by the group common downlink control information is indicated implicitly by one or more of a control channel element resource mapping, or a demodulation reference signal mapping, or a cyclic redundancy check masking.

In some examples, the DCI manager 1415 may broadcast the group common downlink control information for the set of UEs in non-connected state and connected state. In some implementations, the group common downlink control information includes a first downlink control information subfield that includes at least scheduling information and a group radio network temporary identifier for a first downlink data channel and a second downlink control information subfield that includes at least scheduling information and a group radio network temporary identifier for a second downlink data channel of the set of downlink data channels. In some examples, the DCI manager 1415 may multicast the group common downlink control information to the set of UEs in non-connected state and connected state. In some examples, the DCI manager 1415 may transmit a first group common downlink control channel for a first group of UEs of the set of UEs, the first group common downlink control channel including scheduling information and a group radio network temporary identifier for a first downlink data channel of the set of downlink data channels. In some examples, the DCI manager 1415 may transmit a second group common downlink control channel for a second group of UEs of the set of UEs, the second group common downlink control channel including scheduling information and a group radio network temporary identifier for a second downlink data channel of the set of downlink data channels.

In some implementations, the set of downlink data channels are scrambled using a respective group radio network temporary identifier of a plurality of group radio network temporary identifiers and are multiplexed based on a multiplexing scheme comprising one or more of code division multiplexing, frequency division multiplexing, space division multiplexing, or time division multiplexing. In some implementations, a multiplexing scheme is included in the scheduling information for the plurality of downlink data channels. In some implementations, the non-connected state includes one or more of an RRC idle state, or an RRC inactive state. In some examples, two configurations of the plurality of resource configurations are associated with one or more of different transport block sizes, or different demodulation reference signal resource configurations, or different time and frequency resource allocations, or different modulation and coding schemes, different frequency hopping schemes, different slot aggregation schemes, different repetition schemes, different waveforms, different hybrid automatic repeat request parameters, different power control parameters, different sharing patterns of preamble occasions and sequences between two-step and four-step random access procedures, different patterns and periodicities for the association of synchronization signal blocks (SSB) with preamble occasions and sequences, different length of random access response windows, different control resource sets or search spaces for random access response messages, or different bandwidth part configurations.

In some examples, the configuration selection manager 1430 may determine a configuration of physical resources and transmission parameters of the set of configurations to be selected by a UE of the set of UEs for communicating with the base station in the non-connected state. In some examples, the data channel manager 1425 may indicate the identified configuration in a downlink data channel of the plurality of downlink data channels multicast to the plurality of UEs, and the communications manager 1405 may receive an uplink transmission from the UE according to the identified configuration.

Figure 15:
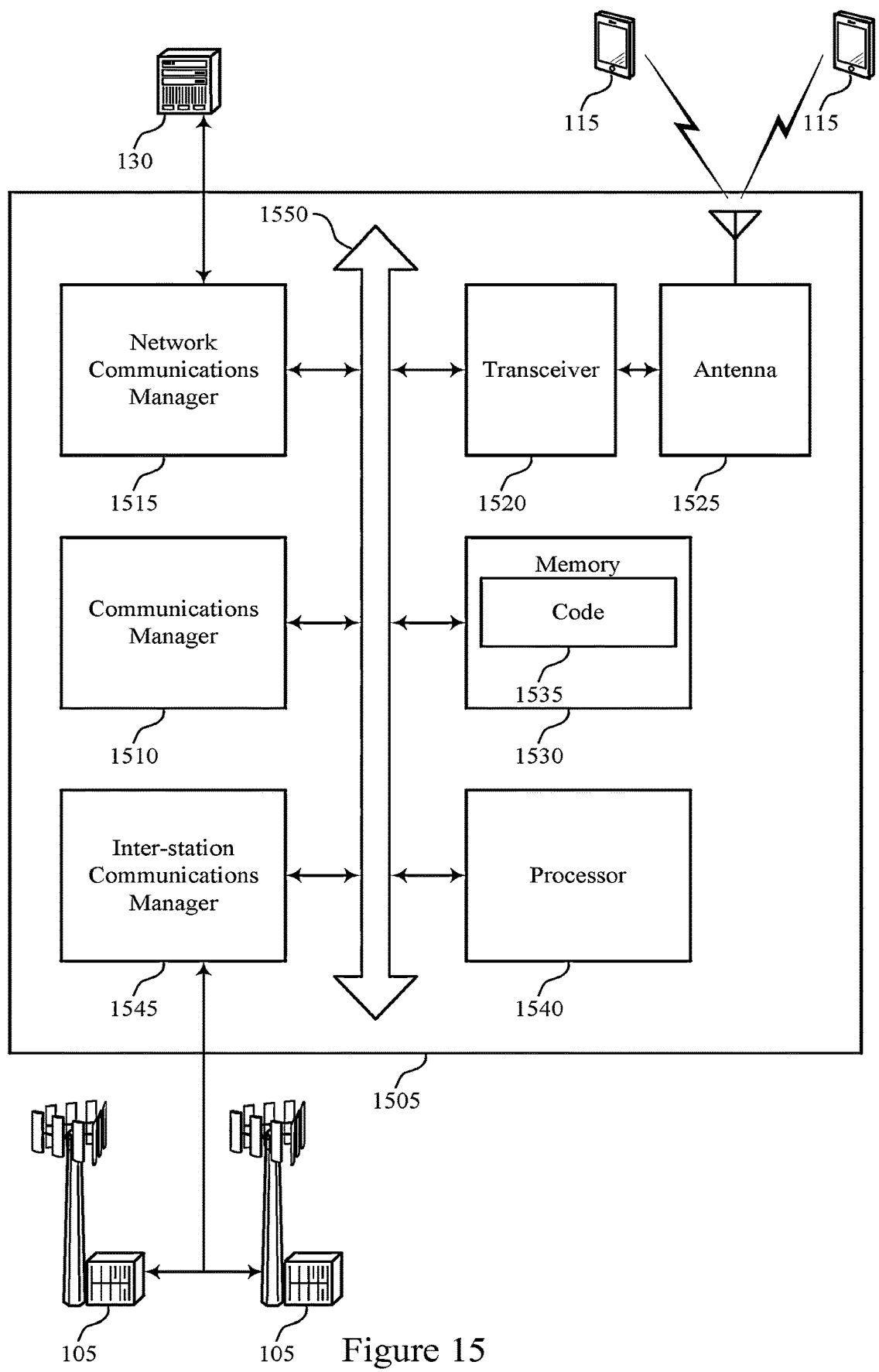
FIG. 15 shows a diagram of a system including a device that supports physical resource and transmission parameter configuration without an RRC connection in accordance with aspects of the present disclosure.

FIG. 15 shows a diagram of a system including a device 1505 that supports physical resource and transmission parameter configuration without an RRC connection in accordance with aspects of the present disclosure. The device 1505 may be an example of or include the components of device 1205, device 1305, or a base station 105. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (for example, bus 1550).

The communications manager 1510 may determine a set of configurations of physical resources and transmission parameters usable by a plurality of user equipment (UEs) to use, while operating in a non-connected state, for a grant-free uplink transmission to the base station. The communications manager 1510 may transmit, in one or more group common downlink control channels, group common downlink control information including at least scheduling information and a group radio network temporary identifier for each of for a set of downlink data channels, and the communications manager 1510 may scramble each of the set of downlink data channels with a respective group radio network temporary identifier. The communications manager 1510 may multicast, in each downlink data channel of the set of downlink data channels, a configuration of physical resources and transmission parameters of the set of configurations for a subset of the set of UEs according to the scheduling information transmitted in the group common downlink control channels. The communications manager

1510 may multiplex each downlink data channel with other downlink data channels of the plurality of downlink data channels scheduled by the one or more group common downlink control channels based on a multiplexing scheme comprising one or more of code division multiplexing, frequency division multiplexing, space division multiplexing, or time division multiplexing, where a multiplexing scheme is included in the scheduling information for the plurality of downlink data channels.

The network communications manager 1515 may manage communications with the core network (for example, via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some implementations, the wireless device may include a single antenna 1525. However, In some implementations the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (for example, the processor 1540) cause the device to perform various functions described herein. In some implementations, the memory 1530 may contain, among other things, a BIOS which may control basic hardware or software operation such as the interaction with peripheral components or devices.

The processor 1540 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1540 may be configured to operate a memory array using a memory controller. In some implementations, a memory controller may be integrated into processor 1540. The processor 1540 may be configured to execute computer-readable instructions stored in a memory (for example, the memory 1530) to cause the device 1505 to perform various functions (for example, functions or tasks supporting physical resource and transmission parameter configuration without an RRC connection).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some implementations, the code 1535 may not be directly executable by the processor 1540 but may cause a computer (for example, when compiled and executed) to perform functions described herein.

Figure 16:
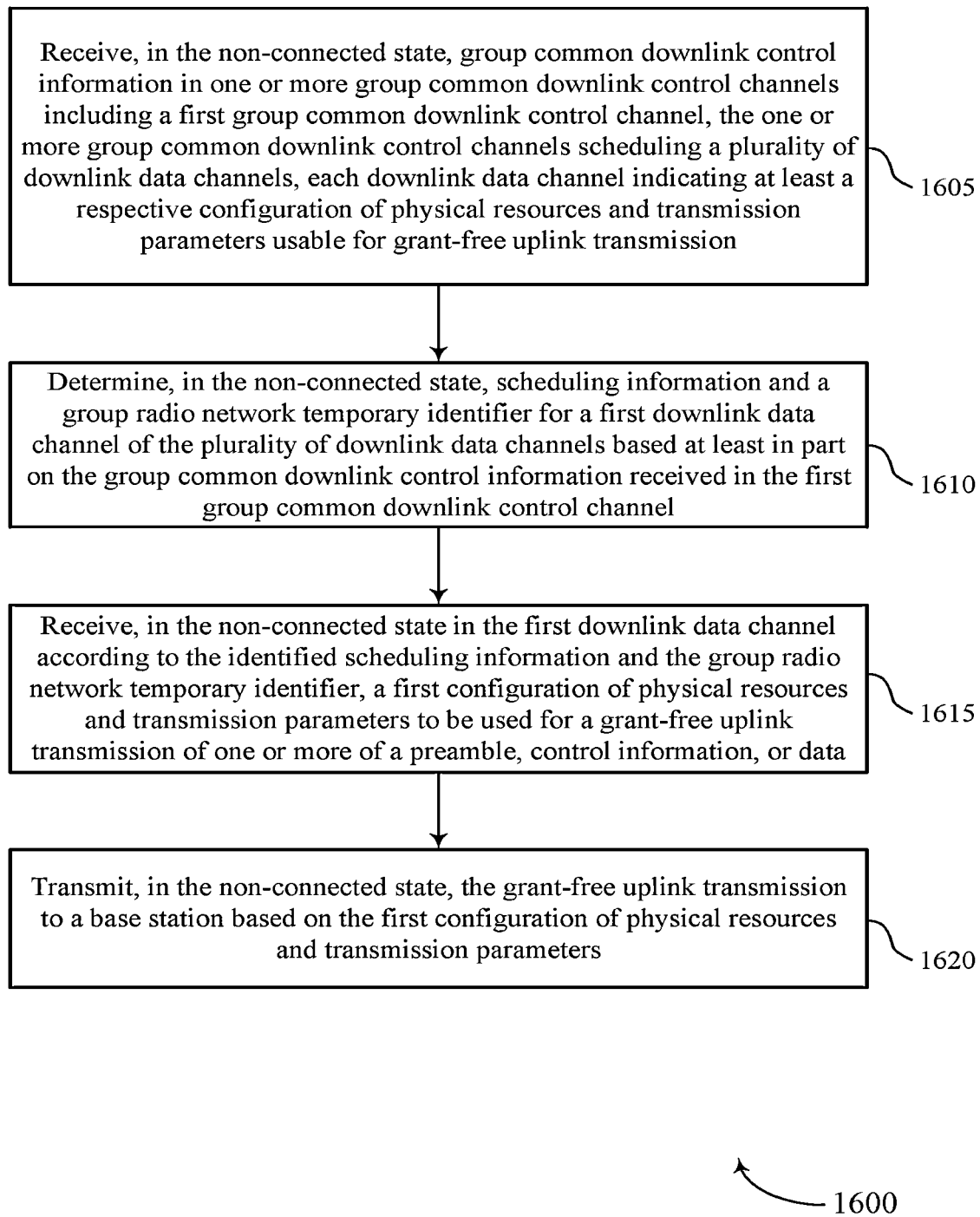
FIGS. 16 and 17 show flowcharts illustrating example processes that support physical resource and transmission parameter configuration without an RRC connection in accordance with aspects of the present disclosure.

FIG. 16 shows a flowchart illustrating a method 1600 that supports physical resource and transmission parameter configuration without an RRC connection in accordance with aspects of the present disclosure. The operations of method 1600 may be implemented by a UE 115 or its components. For example, the operations of method 1600 may be performed by a communications manager as described with reference to FIGS. 8-11. In some examples, a UE may execute a set of instructions to control the functional elements of the UE to perform the functions described below. Additionally, or alternatively, a UE may perform aspects of the functions described below using special-purpose hardware.

At 1605, the UE may receive, in the non-connected state, group common downlink control information in one or more group common downlink control channels including a first group common downlink control channel, the one or more group common downlink control channels scheduling a set of downlink data channels, each downlink data channel indicating at least a respective configuration of physical resources and transmission parameters usable for grant-free uplink transmission. The operations of 1605 may be performed according to the methods described herein. In some examples, aspects of the operations of 1605 may be performed by a DCI manager as described with reference to FIGS. 8-11.

At 1610, the UE may determine, in the non-connected state, scheduling information and a group radio network temporary identifier for a first downlink data channel of the set of downlink data channels based on the group common downlink control information received in the first group common downlink control channel. The operations of 1610 may be performed according to the methods described herein. In some examples, aspects of the operations of 1610 may be performed by a scheduling manager as described with reference to FIGS. 8-11.

At 1615, the UE may receive, in the non-connected state in the first downlink data channel according to the identified scheduling information and the group radio network temporary identifier, a first configuration of physical resources and transmission parameters to be used for a grant-free uplink transmission of one or more of a preamble, control information, or data. The operations of 1615 may be performed according to the methods described herein. In some examples, aspects of the operations of 1615 may be performed by a configuration manager as described with reference to FIGS. 8-11.

At 1620, the UE may transmit, in the non-connected state, a grant-free uplink transmission to the base station based on the first configuration of physical resources and transmission parameters. The operations of 1620 may be performed according to the methods described herein. In some examples, aspects of the operations of 1620 may be performed by a configuration manager as described with reference to FIGS. 8-11.

Figure 17:
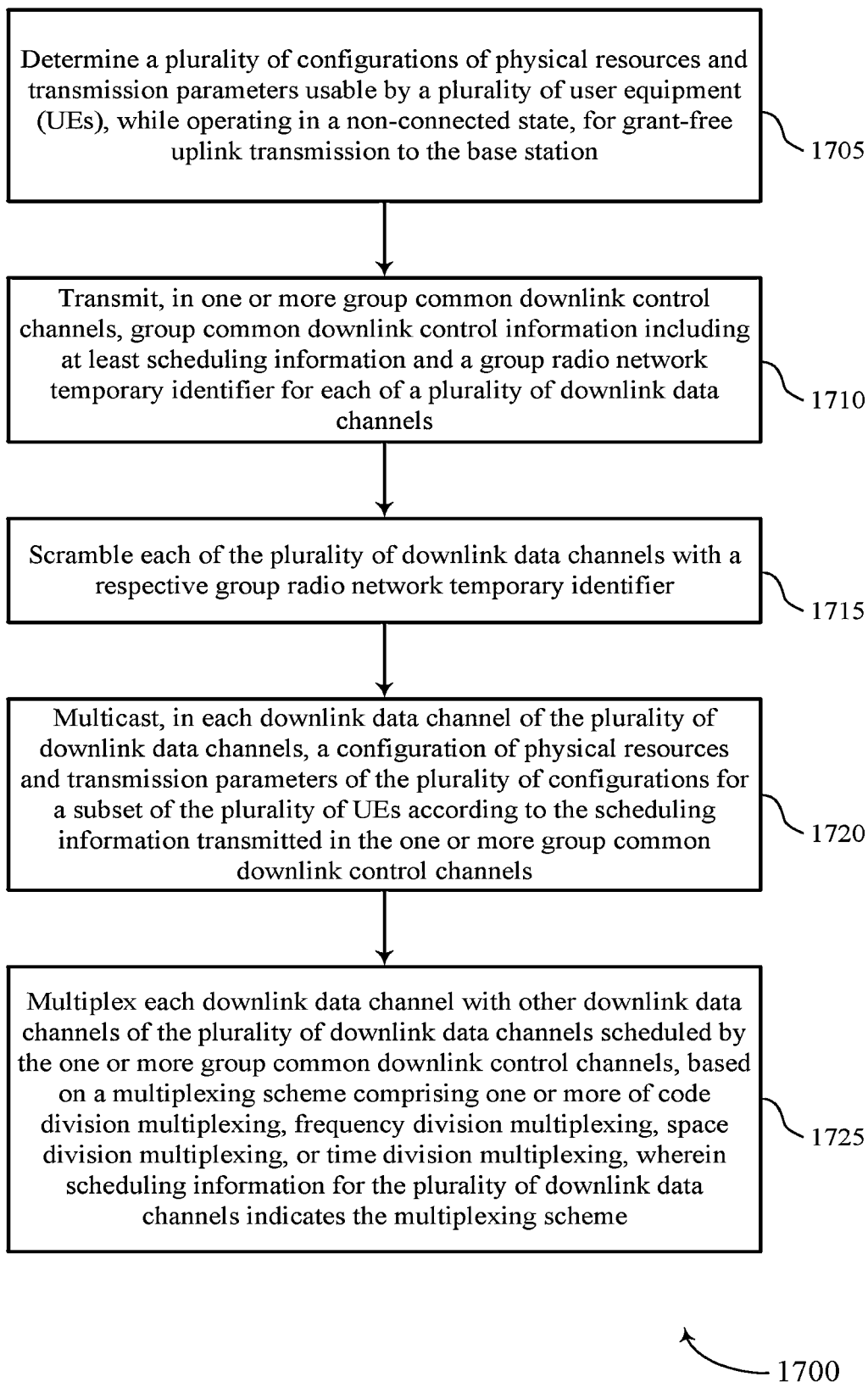

FIG. 17 shows a flowchart illustrating a method 1700 that supports physical resource and transmission parameter configuration without an RRC connection in accordance with aspects of the present disclosure. The operations of method 1700 may be implemented by a base station 105 or its components. For example, the operations of method 1700 may be performed by a communications manager as described with reference to FIGS. 12-15. In some examples, a base station may execute a set of instructions to control the functional elements of the base station to perform the functions described below. Additionally, or alternatively, a base station may perform aspects of the functions described below using special-purpose hardware.

At 1705, the base station may determine a set of configurations of physical resources and transmission parameters usable by a plurality of user equipment (UEs) to use, while operating in a non-connected state, for a grant-free uplink transmission to the base station. The operations of 1705 may be performed according to the methods described herein. In some examples, aspects of the operations of 1705 may be performed by a configuration identifier as described with reference to FIGS. 12-15.

At 1710, the base station may transmit, in one or more group common downlink control channels, group common downlink control information including at least scheduling information and a group radio network temporary identifier for each of for a set of downlink data channels. The operations of 1710 may be performed according to the methods described herein. In some examples, aspects of the operations of 1710 may be performed by a DCI manager as described with reference to FIGS. 12-15.

At 1715, the base station may scramble each of the set of downlink data channels with a respective group radio network temporary identifier. The operations of 1715 may be performed according to the methods described herein. In some examples, aspects of the operations of 1715 may be performed by a scrambler as described with reference to FIGS. 12-15.

At 1720, the base station may multicast, in each downlink data channel of the set of downlink data channels, a configuration of physical resources and transmission parameters of the set of configurations for a subset of the set of UEs according to the scheduling information transmitted in the group common downlink control channels. The operations of 1720 may be performed according to the methods described herein. In some examples, aspects of the operations of 1720 may be performed by a data channel manager as described with reference to FIGS. 12-15.

At 1725, the base station may multiplex each downlink data channel with other downlink data channels of the plurality of downlink data channels scheduled by the one or more group common downlink control channels based on a multiplexing scheme comprising one or more of code division multiplexing, frequency division multiplexing, space division multiplexing, or time division multiplexing, where a multiplexing scheme is included in the scheduling information for the plurality of downlink data channels. The operations of 1715 may be performed according to the methods described herein. In some examples, aspects of the operations of 1715 may be performed by a data channel manager as described with reference to FIGS. 12-15.

It is noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), among other examples. CDMA2000 covers IS-2000, IS-95, and IS-856 standards. IS-2000 Releases may be commonly referred to as CDMA2000 1×, 1×, among other examples. IS-856 (TIA-856) is commonly referred to as CDMA2000 1×EV-DO, High Rate Packet Data (HRPD), among other examples. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, among other examples. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed, unlicensed, among other examples) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, among other examples). An eNB for a macro cell may be referred to as a macro eNB. An eNB for a small cell may be referred to as a small cell eNB, a pico eNB, a femto eNB, or a home eNB. An eNB may support one or multiple (for example, two, three, four, among other examples) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE) operating in a non-connected state, comprising:
receiving, in the non-connected state, group common downlink control information in one or more group common downlink control channels including a first group common downlink control channel, the one or more group common downlink control channels scheduling a plurality of downlink data channels;
determining, in the non-connected state, scheduling information and a group radio network temporary identifier associated with a first downlink data channel of the plurality of downlink data channels based at least in part on the group common downlink control information received in the first group common downlink control channel;
receiving, in the non-connected state based at least in part on the determined scheduling information and the group radio network temporary identifier, a first configuration of physical resources and transmission parameters associated with the first downlink data channel, the first configuration of physical resources and transmission parameters to be used for a grant-free uplink transmission of one or more of a preamble, control information, or data; and transmitting, in the non-connected state, the grant-free uplink transmission to a base station based on the first configuration of physical resources and transmission parameters.

2. The method of claim 1, further comprising:
determining one or more selection criteria associated with respective configurations of physical resources and transmission parameters indicated by the plurality of downlink data channels; and
selecting the first downlink data channel that includes the first configuration of physical resources and transmission parameters based at least in part on the determined one or more selection criteria.

3. The method of claim 2, further comprising receiving an indication of the one or more selection criteria in the group common downlink control information or in an information block different than the group common downlink control information.

4. The method of claim 2, wherein the one or more selection criteria comprise one or more of a reference signal power threshold, a reference signal strength threshold, a reference signal quality threshold, a cell-specific parameter associated with the base station, a buffer status, a power head room, or a quality of service class.

5. The method of claim 1, wherein each downlink data channel of the plurality of downlink data channels is scrambled using a respective group radio network temporary identifier of a plurality of group radio network temporary identifiers, and wherein the plurality of group radio network temporary identifiers are received in the group common downlink control information or in an information block different than the group common downlink control information.

6. The method of claim 1, further comprising receiving, in the group common downlink control information, an indication of a number of the plurality of downlink data channels scheduled by the group common downlink control information.

7. The method of claim 6, further comprising receiving a master information block or a system information block comprising an indication of a number of the one or more group common downlink control channels including the group common downlink control information.

8. The method of claim 1, wherein a number of the plurality of downlink data channels scheduled by the group common downlink control information is implicitly indicated by one or more of a control channel element resource mapping, a demodulation reference signal mapping, or a cyclic redundancy check masking.

9. The method of claim 1, wherein receiving the group common downlink control information comprises:
receiving a first downlink control information subfield of the group common downlink control information and extracting the scheduling information and the group radio network temporary identifier used to scramble the first downlink data channel; and
receiving a second downlink control information subfield of the group common downlink control information and extracting scheduling information and a group radio network temporary identifier used to scramble a second downlink data channel of the plurality of downlink data channels.

10. The method of claim 9, wherein the first downlink control information subfield and the second downlink control information subfield of the group common downlink control information are mapped to the first group common downlink control channel and a second group common downlink control channel, respectively, which are multicast in a common search space configured in an initial downlink bandwidth part.

11. The method of claim 9, wherein the first downlink control information subfield and the second downlink control information subfield of the group common downlink control information are aggregated and mapped to a same group common downlink control channel, which is multicast in a common search space configured in an initial downlink bandwidth part.

12. The method of claim 1, wherein:
the plurality of downlink data channels are multiplexed based on a multiplexing scheme comprising one or more of code division multiplexing, frequency division multiplexing, space division multiplexing, or time division multiplexing; and
scheduling information of the group common downlink control information indicates the multiplexing scheme.

13. The method of claim 1, wherein two configurations of physical resources and transmission parameters are associated with one or more of different transport block sizes, different demodulation reference signal resource configurations, different time and frequency resource allocations, different modulation and coding schemes, different frequency hopping schemes, different slot aggregation schemes, different repetition schemes, different waveforms, different hybrid automatic repeat request parameters, different power control parameters, different sharing patterns of preamble occasions and sequences between two-step and four-step random access procedures, different patterns and periodicities for an association of synchronization signal blocks (SSB) with preamble occasions and sequences, different length of random access response windows, different control resource sets or search spaces for random access response messages, or different bandwidth part configurations.

14. The method of claim 1, wherein the first configuration of physical resources and transmission parameters comprises one or more of a semi-persistent configuration, a default configuration, or a fallback configuration, usable by UEs in the non-connected state and a connected state.

15. The method of claim 1, wherein the first configuration of physical resources and transmission parameters is received in the first downlink data channel.

16. A method for wireless communication at a base station, comprising:
determining a plurality of configurations of physical resources and transmission parameters usable by a plurality of user equipment (UEs), while operating in a non-connected state, for grant-free uplink transmission to the base station;
transmitting, in one or more group common downlink control channels, group common downlink control information including at least scheduling information and a group radio network temporary identifier associated with each of a plurality of downlink data channels;
scrambling each of the plurality of downlink data channels with a respective group radio network temporary identifier;
multicasting, for each downlink data channel of the plurality of downlink data channels, a configuration of physical resources and transmission parameters of the plurality of configurations for a subset of the plurality of UEs according to the scheduling information transmitted in the one or more group common downlink control channels; and multiplexing each downlink data channel with other downlink data channels of the plurality of downlink data channels scheduled by the one or more group common downlink control channels based on a multiplexing scheme comprising one or more of code division multiplexing, frequency division multiplexing, space division multiplexing, or time division multiplexing.

17. The method of claim 16, further comprising transmitting one or more selection criteria associated with the plurality of configurations, the one or more selection criteria being for the plurality of UEs to use to select from the plurality of configurations.

18. The method of claim 17, wherein the one or more selection criteria or a plurality of group radio network temporary identifiers used to scramble the plurality of downlink data channels are transmitted together with the group common downlink control information.

19. The method of claim 17, wherein the one or more selection criteria are transmitted in an information block separately from the group common downlink control information.

20. The method of claim 17, wherein the one or more selection criteria comprise one or more of a reference signal power threshold, or a reference signal strength threshold, or a reference signal quality threshold, or a cell-specific parameter associated with the base station, or a buffer status, or a power head room, or a quality of service class.

21. The method of claim 17, wherein transmitting the one or more selection criteria comprises broadcasting the one or more selection criteria for the plurality of UEs in the non-connected state and a connected state.

22. The method of claim 16, further comprising transmitting, in the group common downlink control information, a master information block or a system information block comprising an indication of a number of the plurality of downlink data channels scheduled by the group common downlink control information.

23. The method of claim 16, wherein a number of the plurality of downlink data channels scheduled by the group common downlink control information is indicated implicitly by one or more of a control channel element resource mapping, or a demodulation reference signal mapping, or a cyclic redundancy check masking.

24. The method of claim 16, wherein transmitting the group common downlink control information comprises:
transmitting a first group common downlink control channel for a first group of UEs of the plurality of UEs, the first group common downlink control channel comprising scheduling information and a group radio network temporary identifier for a first downlink data channel of the plurality of downlink data channels; and
transmitting a second group common downlink control channel for a second group of UEs of the plurality of UEs the second group common downlink control channel comprising scheduling information and a group radio network temporary identifier for a second downlink data channel of the plurality of downlink data channels.

25. The method of claim 16, wherein the scheduling information for the plurality of downlink data channels indicates the multiplexing scheme.

26. An apparatus for wireless communication at a user equipment (UE) operating in a non-connected state, comprising:
a processor; and
a memory coupled with the processor, with instructions stored in the memory, the instructions being executable by the processor to cause the apparatus to:
receive, in the non-connected state, group common downlink control information in one or more group common downlink control channels including a first group common downlink control channel, the one or more group common downlink control channels scheduling a plurality of downlink data channels;
determine, in the non-connected state, scheduling information and a group radio network temporary identifier associated with a first downlink data channel of the plurality of downlink data channels based at least in part on the group common downlink control information received in the first group common downlink control channel;
receive, in the non-connected state based at least in part on the determined scheduling information and the group radio network temporary identifier, a first configuration of physical resources and transmission parameters associated with the first downlink data channel, the first configuration of physical resources and transmission parameters to be used for a grant-free uplink transmission of one or more of a preamble, control information, or data; and
transmitting, in the non-connected state, the grant-free uplink transmission to a base station based on the first configuration of physical resources and transmission parameters.

27. The apparatus of claim 26, wherein the instructions are further executable by the processor to cause the apparatus to:
determine one or more selection criteria associated with respective configurations of physical resources and transmission parameters indicated by the plurality of downlink data channels; and
select the first downlink data channel that includes the first configuration of physical resources and transmission parameters based at least in part on the determined one or more selection criteria.

28. The apparatus of claim 26, wherein each downlink data channel of the plurality of downlink data channels is scrambled using a respective group radio network temporary identifier of a plurality of group radio network temporary identifiers, and wherein the plurality of group radio network temporary identifiers are received in the group common downlink control information or in an information block different than the group common downlink control information.

29. The apparatus of claim 26, wherein the instructions are further executable by the processor to cause the apparatus to receive, in the group common downlink control information, an indication of a number of the plurality of downlink data channels scheduled by the group common downlink control information.

30. An apparatus for wireless communication at a base station, comprising:
a processor; and
a memory coupled with the processor, with instructions stored in the memory, the instructions being executable by the processor to cause the apparatus to:
determine a plurality of configurations of physical resources and transmission parameters usable by a plurality of user equipment (UEs), while operating in a non-connected state, for grant-free uplink transmission;

transmit, in one or more group common downlink control channels, group common downlink control information including at least scheduling information and a group radio network temporary identifier associated with each of a plurality of downlink data channels;

scramble each of the plurality of downlink data channels with a respective group radio network temporary identifier;

multicast, for each downlink data channel of the plurality of downlink data channels, a configuration of physical resources and transmission parameters of the plurality of configurations for a subset of the plurality of UEs according to the scheduling information transmitted in the one or more group common downlink control channels; and multiplex each downlink data channel with other downlink data channels of the plurality of downlink data channels scheduled by the one or more group common downlink control channels, based on a multiplexing scheme comprising one or more of code division multiplexing, frequency division multiplexing, space division multiplexing, or time division multiplexing.

* * * * *